(12) United States Patent
Murakami

(10) Patent No.: US 7,065,237 B2
(45) Date of Patent: Jun. 20, 2006

(54) IMAGE PROCESSING APPARATUS AND METHOD

(75) Inventor: Tomochika Murakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 10/314,168

(22) Filed: Dec. 9, 2002

(65) Prior Publication Data

US 2003/0123698 A1    Jul. 3, 2003

(30) Foreign Application Priority Data

Dec. 10, 2001   (JP) ............................. 2001-376384
Dec. 10, 2001   (JP) ............................. 2001-376385

(51) Int. Cl.
   *G06K 9/00*   (2006.01)
(52) U.S. Cl. ...................... 382/137; 382/131
(58) Field of Classification Search ................ 382/100, 382/181, 191, 199
   See application file for complete search history.

(56) References Cited

U.S. PATENT DOCUMENTS

| | | | |
|---|---|---|---|
| 6,539,106 B1* | 3/2003 | Gallarda et al. ............. | 382/149 |
| 6,798,893 B1* | 9/2004 | Tanaka ........................ | 382/100 |
| 6,839,673 B1* | 1/2005 | Choi et al. .................. | 704/273 |
| 2001/0017709 A1 | 8/2001 | Murakami et al. | |
| 2001/0030759 A1* | 10/2001 | Hayashi et al. .............. | 358/1.9 |
| 2002/0002679 A1 | 1/2002 | Murakami et al. | |
| 2002/0061118 A1* | 5/2002 | Tachibana et al. ........... | 382/100 |
| 2004/0015363 A1* | 1/2004 | Rhoads ........................ | 704/273 |
| 2005/0013436 A1* | 1/2005 | Tanaka ........................ | 380/202 |
| 2005/0036613 A1* | 2/2005 | Zhou et al. .................. | 380/203 |

* cited by examiner

*Primary Examiner*—Bhavesh M. Mehta
*Assistant Examiner*—ONeal R. Mistry
(74) *Attorney, Agent, or Firm*—Fitzpatrick, Cella, Harper & Scinto

(57) ABSTRACT

This invention provides an image processing apparatus and method, which embed a digital watermark having strong robustness against geometrical transformation/edit processes such as rotation, scaling, translation, and the like, and an image processing apparatus and method, which can accurately extract the embedded digital watermark even after the conversion/edit process such as rotation of an image or the like. A Fourier transformer (901) converts an image input from an image input unit (900) into amplitude component data, and phase component data. An envelope ring pattern generator (902) generates an embedding pattern of digital watermark information, which is expressed by a set of lines that define a circle as an envelope, on the amplitude component data. An envelope ring pattern embedding unit (903) embeds digital watermark information at predetermined positions on the line. An inverse Fourier transformer (904) computes the inverse frequency transforms of the amplitude component data embedded with the digital watermark information using the phase component data.

11 Claims, 31 Drawing Sheets

FIG. 12
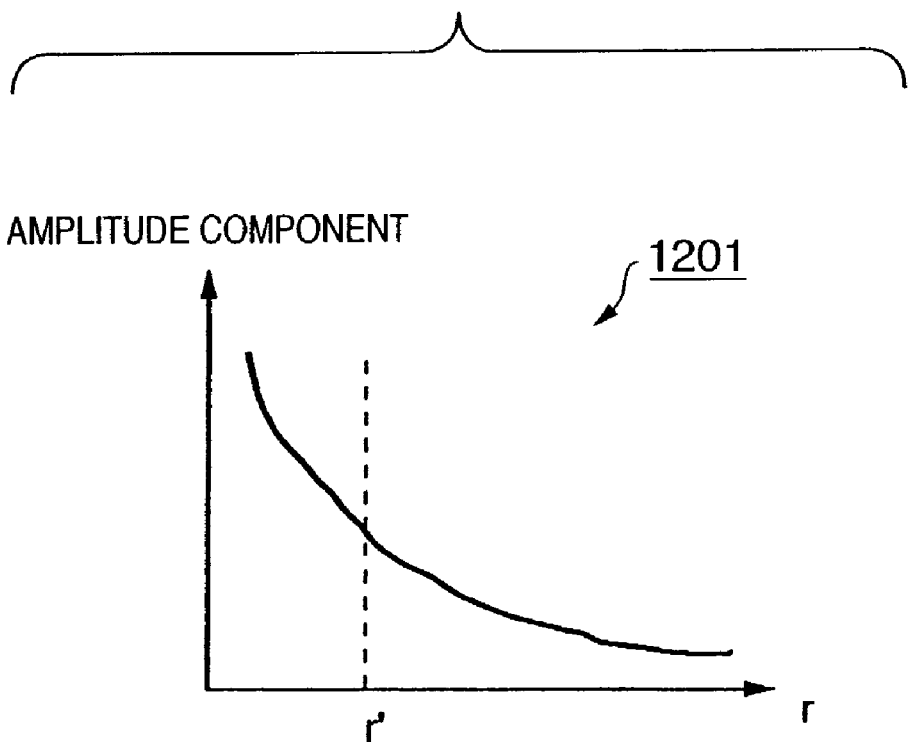
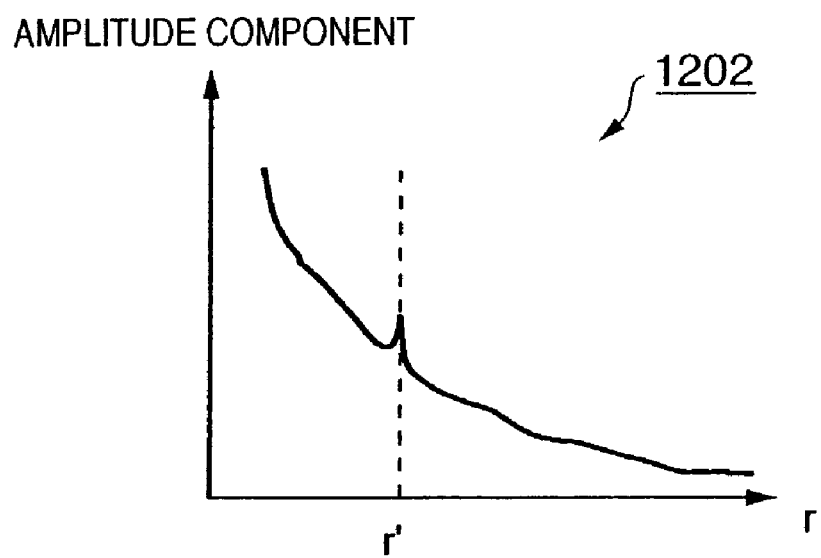

FIG. 15
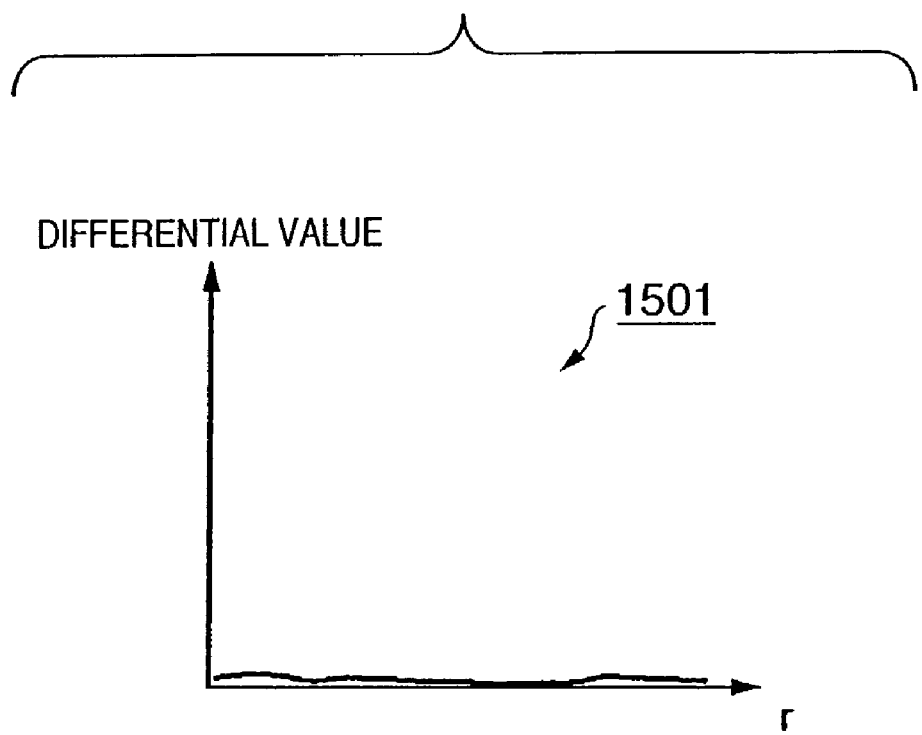
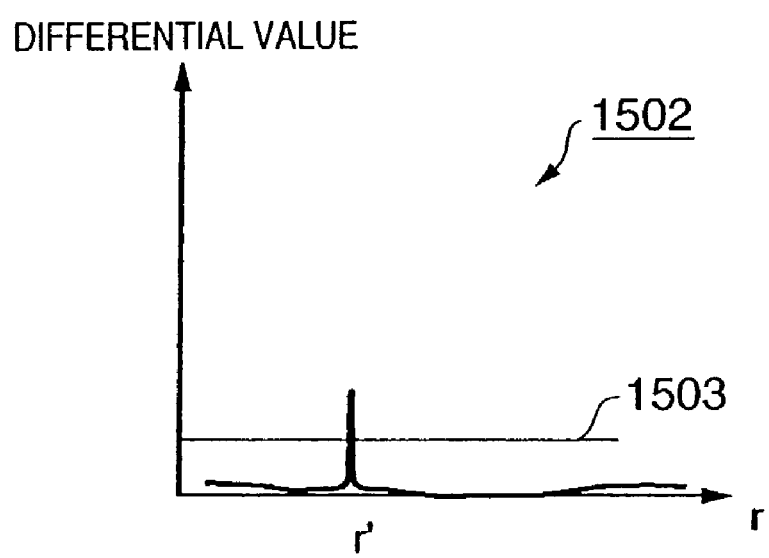

FIG. 16
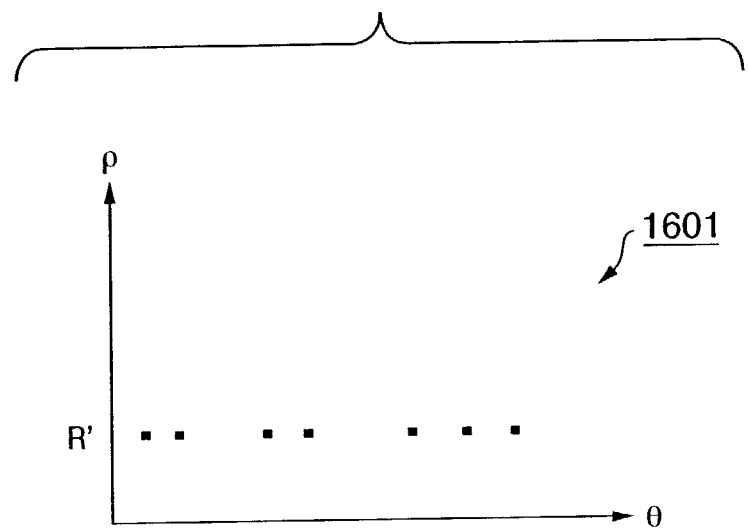
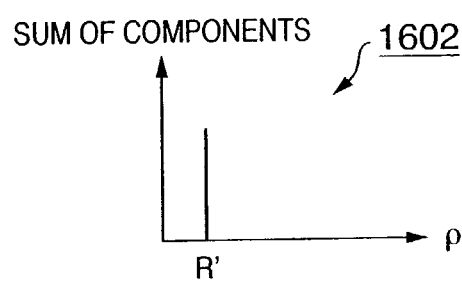
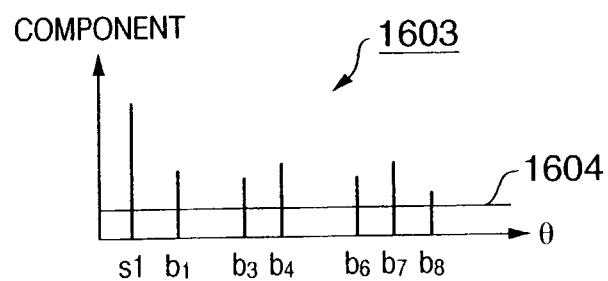

FIG. 20
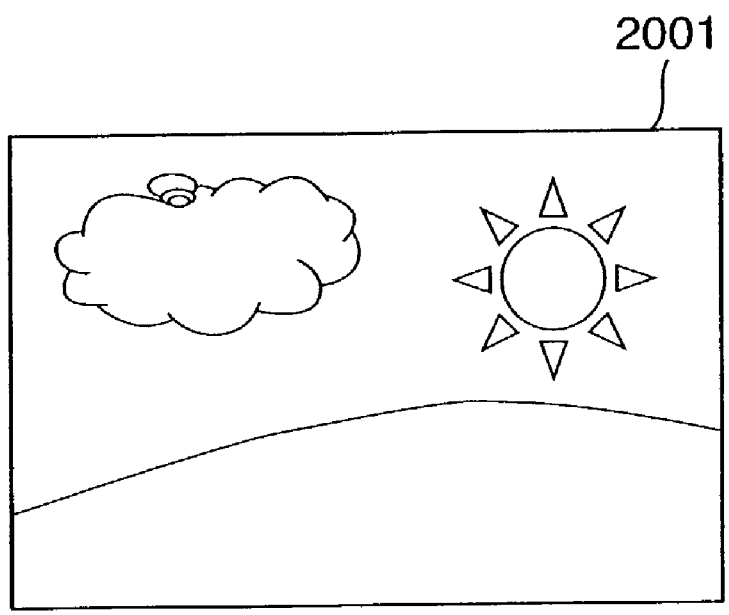
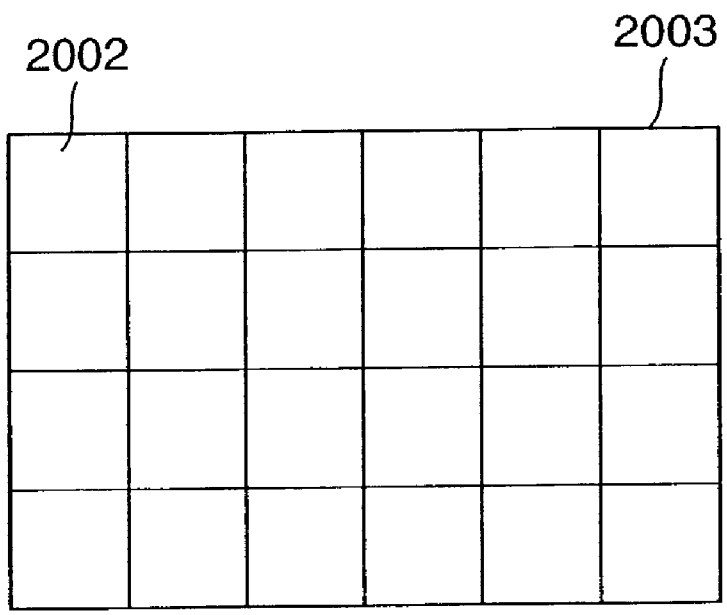

F I G. 23
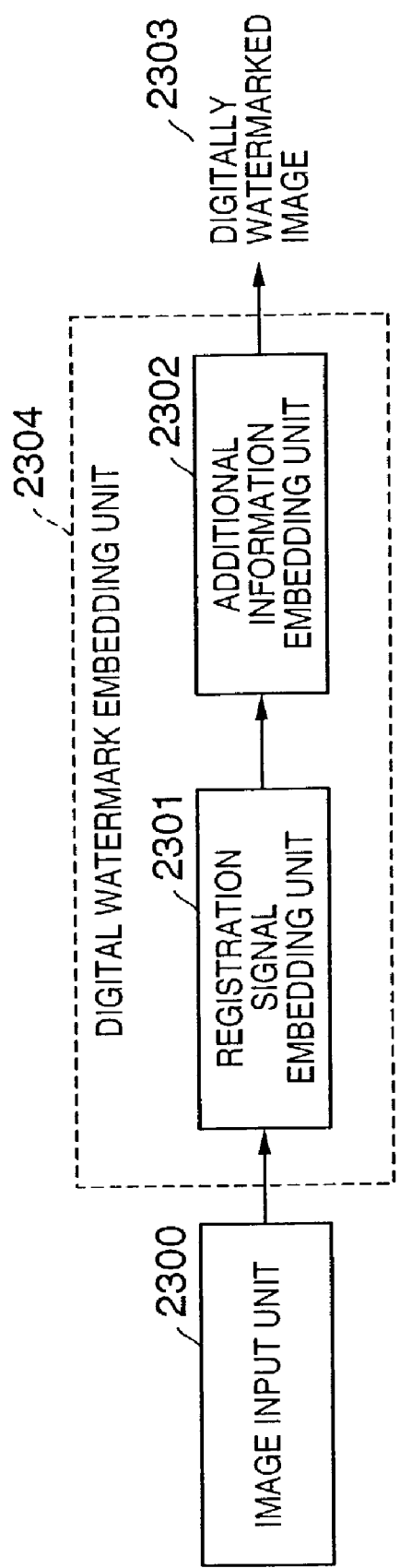

IMAGE PROCESSING APPARATUS AND METHOD

FIELD OF THE INVENTION

The present invention relates to an image processing apparatus and method for embedding a digital watermark in a digital image and an image processing apparatus and method for extracting the embedded digital watermark from a digital image.

BACKGROUND OF THE INVENTION

In recent years, as computers and networks have advanced remarkably, various contents such as text data, image data, audio data, and the like are distributed as digital data. Digital data itself is free from deterioration due to aging, and can be permanently saved in a perfect condition. However, since it is easy to form copies of data, how to protect the copyrights of the contents poses a serious problem. Therefore, the security technique for copyright protection has gained more importance.

As one of techniques for copyright protections, "digital watermarking" is known. Digital watermarking is a technique for embedding various kinds of information so that no one can recognize information (watermark information) embedded in contents such as digital image data, audio data, text data, and the like, i.e., so as not to adversely influence the quality of data in which such information is to be embedded. For example, when the name of a copyright proprietor, the ID of a purchaser, or the like is embedded as watermark information to suppress use without consent by means of illicit copies.

Digital watermarking can be applied not only to copyright protection but also to detection of any tampered position of digital data by embedding information on digital data in advance, and checking consistency of the information embedded in the digital information.

In general, as a digital watermarking method, a method that embeds watermark information in a portion of digital data where a change in data hardly influences the quality is used. Therefore, "quality compared with original digital data before watermarking", "robustness or resiliency of digital watermark", and "information size that can be embedded" of digitally watermarked digital data suffer a tradeoff relationship.

Note that "robustness of digital watermark" means a degree of embedded information that can be extracted even after digitally watermarked digital data has undergone various conversion/edit processes. For example, conversion/edit processes of digitally watermarked digital data include "JPEG compression", "rotation", "translation", and the like of a digital image.

In order to provide the robustness against such geometrical attacks, in case of, e.g., an image, a method of simultaneously embedding an alignment signal used to detect geometrical attacks such as rotation, scaling, translation, and the like has been proposed. Such alignment signal is generally called a registration signal.

When the registration signal is embedded in an image, even when the image has suffered a geometrical attack, geometrical transformation applied to the image can be calculated by analyzing the registration signal.

Therefore, since the original geometrical state of the attacked image can be detected, an original embedded position of a digital watermark can be correctly detected. When a digital watermarking algorithm or extraction algorithm which has no robustness against geometrical attacks, and a registration signal that detects geometrical transformation are embedded in combination, digital watermarking having robustness against geometrical attacks can be implemented.

However, digital watermarking as represented by patchwork and spread spectrum, which embed information using the difference between pixel values in two regions, must accurately detect the embedded position of watermark information upon extraction. Hence, when an image has undergone geometrical transformation/edit processes such as rotation, scaling, translation, and the like, it is difficult to accurately extract watermark information.

SUMMARY OF THE INVENTION

The present invention has been proposed to solve the conventional problems, and has as its object to provide an image processing apparatus and method, which embed a digital watermark robust against geometrical transformation/edit processes such as rotation, scaling, translation, and the like, and an image processing apparatus and method, which can accurately extract an embedded digital watermark even after the conversion/edit process such rotation or the like of an image.

In order to achieve the above object, according to the present invention, an image processing apparatus for embedding digital watermark information in an image to be imperceptible or nearly imperceptible to the human eye, comprises: frequency transformation means for computing frequency transforms of an image to convert the image into amplitude component data and phase component data; embedding pattern generation means for generating an embedding pattern of digital watermark information, which is expressed by a set of lines having a predetermined envelope, on the generated amplitude component data; digital watermark embedding means for embedding digital watermark information at predetermined positions on the lines in the embedding pattern; and inverse frequency transformation means for computing inverse frequency transforms of the amplitude component data embedded with the digital watermark information using the phase component data.

Meanwhile, a conventional registration signal is embedded as a constant common signal irrespective of an image, additional information, and the like. For this reason, when the average of a plurality of digitally watermarked images obtained by embedding different types of additional information in a single image, is calculated, and the difference from an original image is then calculated, the registration signal as a common signal is readily discovered.

Once the registration signal as a common signal is discovered, the common signal can be removed to take out the robustness against geometrical attacks. Such attacks are generally called coalition attacks.

To solve this problem, the present invention implements detection of geometrical attacks such as rotation, scaling, translation, and the like independently of a change in registration signal by changing a registration signal for alignment and the embedded position of additional information depending on an image and additional information. Also, the present invention implements a method that changes not only a common signal for alignment but also the embedded position of additional information in single digital image data, and extracts them.

It is another object of the present invention to provide an image processing apparatus and method, which can improve robustness against coalition attacks that are effective to analyze and remove a common signal, by changing an alignment signal commonly used to improve the robustness against geometrical attacks on the basis of the image characteristics, additional information, and information for each embedding.

In order to achieve the above object, according to the present invention, an image processing apparatus which comprises digital watermark information embedding means for embedding digital watermark information to be imperceptible or nearly imperceptible to the human eye, comprises: image data input means for inputting image data; frequency transformation means for computing frequency transforms of the image data to convert the image data into amplitude component data and phase component data; alignment information input means for inputting alignment information used to detect geometrical transformation of the image data; parameter input means for inputting a parameter used to change an embedding position on the amplitude component data or a strength upon embedding the alignment information; embedding pattern generation means for generating an embedding pattern of the alignment information, which is expressed by a predetermined function, with respect to the amplitude component data; alignment information embedding means for embedding the alignment information at a predetermined position on the function in the embedding pattern; and inverse frequency transformation means for computing inverse frequency transforms of the amplitude component data embedded with the alignment data using the phase component data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a view for explaining a change process of the Fourier amplitude spectrum done by an envelope ring pattern embedding unit 903;

FIG. 15 is a view for simply explaining the processing contents of an edge extraction unit 1303 in the image processing apparatus;

FIG. 16 shows an example of a Hough transformed image used in an explanation of the internal process of an additional information extraction unit 1306;

FIG. 20 shows a repetitive embedding state of additional information;

FIG. 23 is a block diagram showing the arrangement of an image processing apparatus for embedding a digital watermark according to an embodiment of the present invention;

DETAILED DESCRIPTION OF THE PREFERRED EMBODIMENTS

Preferred embodiments of the present invention will now be described in detail in accordance with the accompanying drawings.

Figure 1:
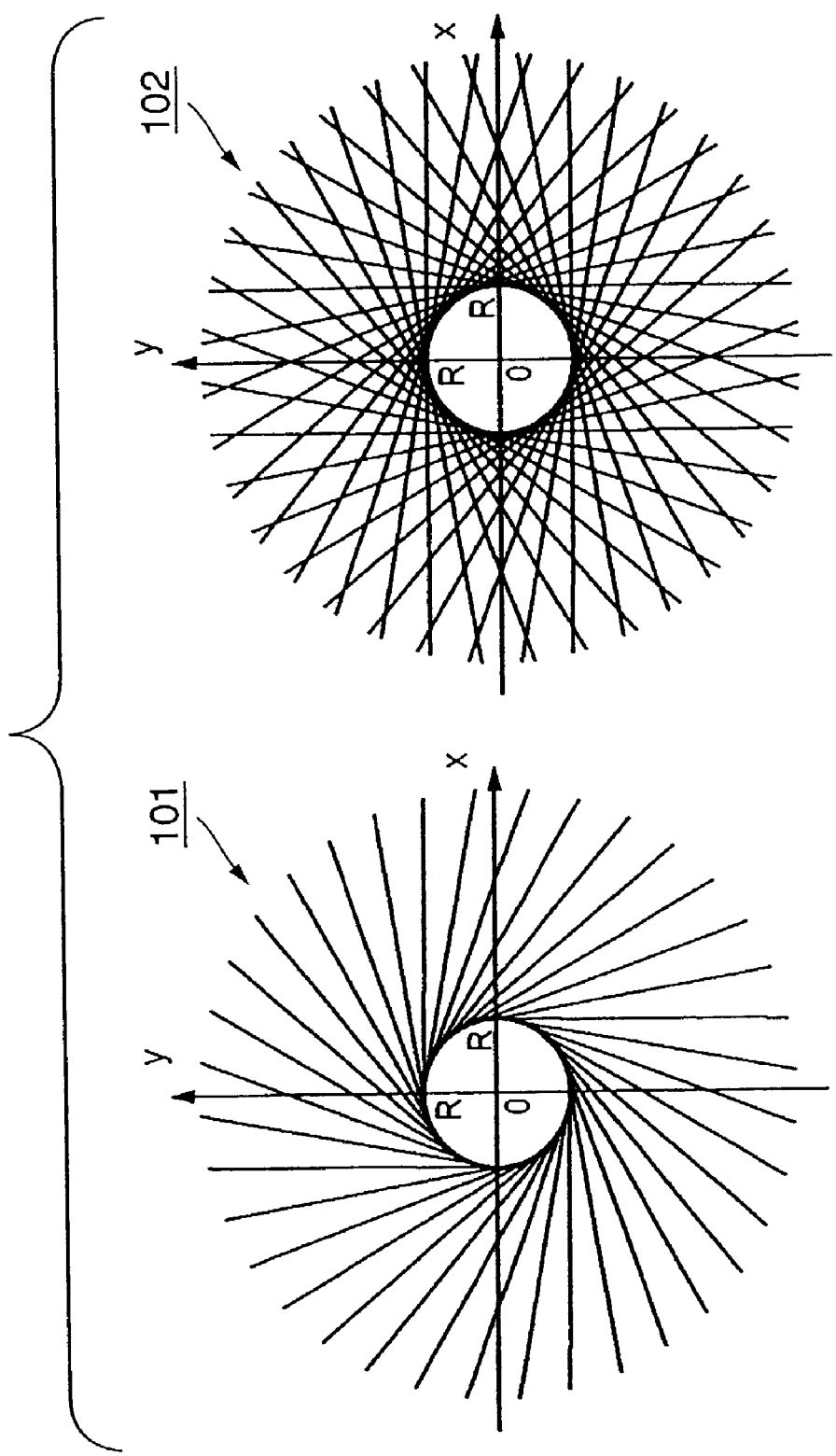
FIG. 1 is a view for explaining examples of digital watermark patterns used in an image processing apparatus according to the present invention.

FIG. 1 is a view for explaining examples of digital watermark patterns used in an image processing apparatus according to the present invention. In FIG. 1, tangents from points (R cos φ, R sin φ) on the circumference of a circle of a radius R, which has an origin on an xy space as the center, are plotted at angles φ set in 10°-increments. Reference numeral 101 in FIG. 1 denotes a pattern formed by drawing tangents from the points (R cos φ, R sin φ) on the circumference in one direction; and 102, a pattern formed by drawings tangents in two directions. That is, the envelope of a set of lines as the tangents to the points (R cos φ, R sin φ) on the circumference forms a circle of radius R having the origin as the center.

Figure 2:
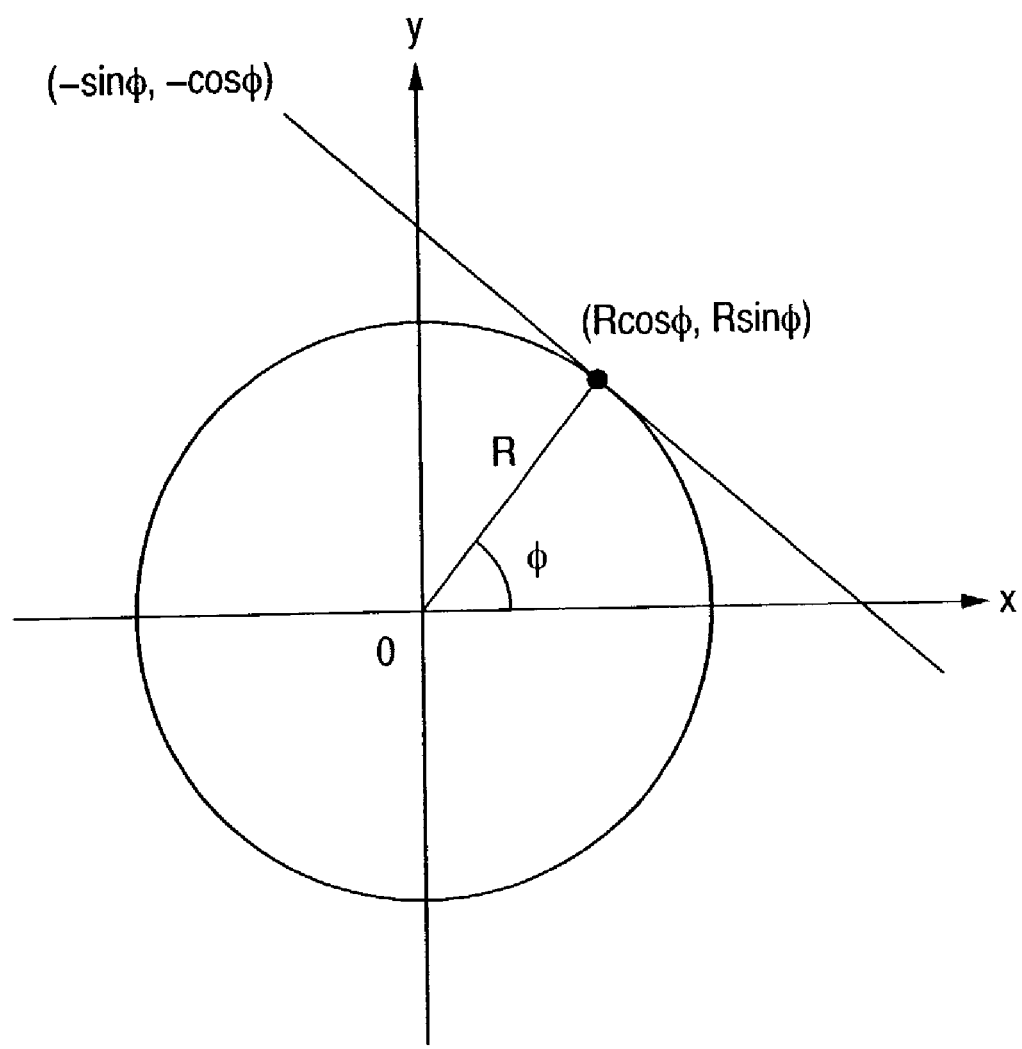
FIG. 2 is a view for explaining the slope of a line segment, which is perpendicular to a tangent to a point (R cos φ, R sin φ) on the circumference at the tangent point.

The figures shown in FIG. 1 are represented by formulas. FIG. 2 is a view for explaining the slope of a line segment which is perpendicular to a tangent to a point (R cos φ, R sin φ) on the circumference at a tangent point. As shown in FIG. 2, since a vector in the tangential direction at a point on the circumference of a radius R is perpendicular to a vector (R cos φ, R sin φ) which is headed from the origin to the point (R cos φ, R sin φ) on the circumference, it can be expressed by (−sin φ, cos φ).

Therefore, (x, y) coordinates on the group of lines shown in FIG. 1 can be expressed by parametric representation using a parameter t as:

$$x = R \cos \phi - t \sin \phi \quad (1)$$

$$y = R \sin \phi + t \cos \phi \quad (2)$$

Note that FIG. 1 represents a case of t<0. In this embodiment, the aforementioned digital watermark pattern expressed by the group of lines is used as a basic pattern used to embed watermark information.

Hough transformation as a method effective for detecting figures such as the group of lines, circle, and the like shown in FIG. 1 from an image will be explained below. In general, figures such as a line, circle, ellipse, and the like that can be expressed by given formulas allow to determine the shape and the position in an image as long as parameters are determined. In this manner, Hough transformation is known as one method that can obtain a figure, which can be expressed by parameters.

An example of line detection by Hough transformation will be explained. For example, if an arbitrary line on the xy space is given by y=mx+c, an arbitrary point ($x_0$, $y_0$) on this line satisfies:

$$y_0 = mx_0 + c \quad (3)$$

If (m, c) are considered as variables, a line can be drawn on an mc space. If this process is done for all pixels that form a single line, which is to undergo line detection, a set of lines on the mc space have an intersection at a given point ($m_0$, $c_0$), and that intersection provides the values of parameters (m, c) calculated to detect a line.

Figure 3:
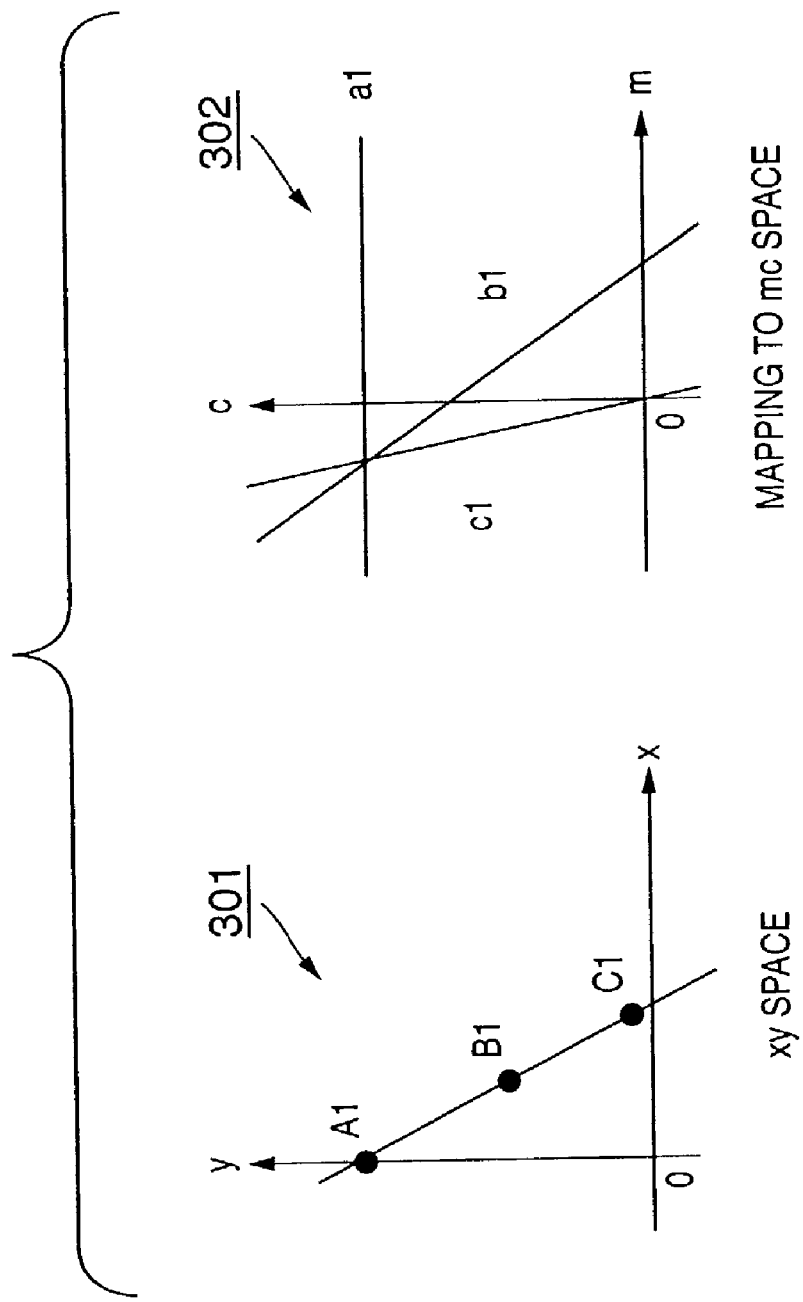
FIG. 3 is a view for explaining mapping of points on a line on an xy space to an mc space.

FIG. 3 is a view for explaining mapping of points on a line on the xy space to the mc space. Referring to FIG. 3, points A1, B1, and C1 on the xy space denoted by reference numeral 301 are respectively mapped to lines a1, b1, and c1 on the mc space denoted by reference numeral 302. Then, the coordinates of an intersection of the lines after mapping are ($m_0$, $c_0$) mentioned above.

The principle of line detection using Hough transformation has been explained. When the above principle is actually programmed using a computer, a two-dimensional array corresponding to the mc space may be prepared, and when a line is drawn on the mc space, a manipulation for incrementing elements of the two-dimensional array where a line passes may be done. However, in case of mapping to the mc space, since the number of slopes m of lines parallel to the y-axis is infinite, a very large array must be prepared to detect a line with high precision.

Hence, if a line is given by ρ=x cos θ+y sin θ, arbitrary coordinates ($x_0$, $y_0$) on that line satisfy:

$$\rho = x_0 \cos \theta + y_0 \cos \theta \quad (4)$$

Figure 4:
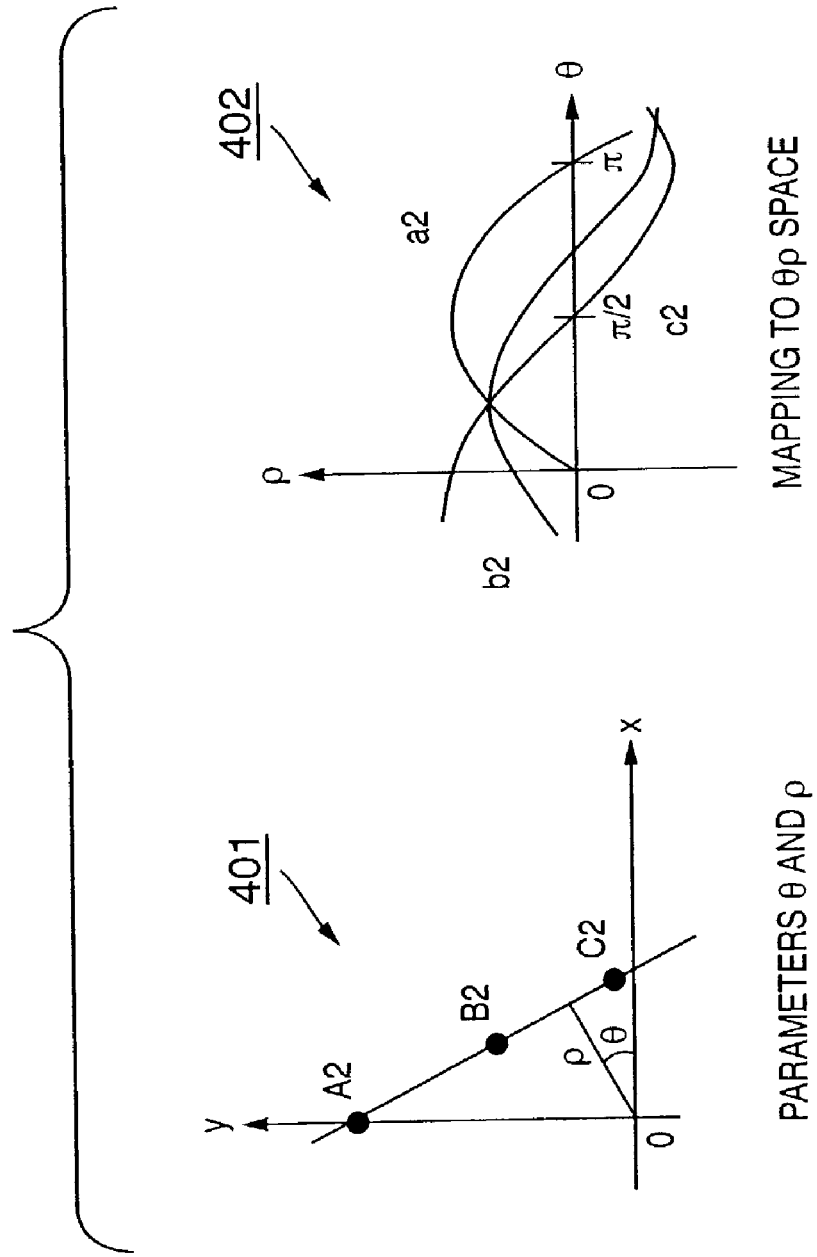
FIG. 4 is a view for explaining mapping of points on a line on the xy space to a θρ space.

FIG. 4 is a view for explaining mapping of points on a line on the xy space to a θρ space. In FIG. 4, ρ is the length of a perpendicular dropped from the origin to a line, and θ is the angle that perpendicular makes with the x-axis. Using equation (4), a point on the xy space is expressed by a sine curve when it is mapped to the θρ space. Referring to FIG. 4, points A2, B2, and C2 on the xy space denoted by reference numeral 401 are respectively mapped to sine curves a2, b2, and c2 on the θρ space denoted by reference numeral 402, and these curves also interest at one point in such case. Therefore, as in the mc space, a line on the xy space can be detected by calculating the intersection on the θρ space.

Since the value ρ is a finite length as small as a diagonal line of a target image in maximum, and the value θ can cope with lines in all directions within only the range from 0 to 2π, the θρ space is prevalently used in normal mapping. Merits of the aforementioned Hough transformation lie in that even a line to be detected, which is discontinuous, can be detected as long as given points are arranged on a line, and even a plurality of lines included in an image can be simultaneously processed.

Hough transformation to the θρ space is applied to the figure of the digital watermark pattern shown in FIG. 1. Transformation from the xy space into the θρ space is given by:

$$\rho = x \cos \theta + y \sin \theta \quad (5)$$

Substitution of equations (1) and (2) into equation (5) yields:

$$\rho = (R \cos \phi - t \sin \theta)\cos \theta + (R \sin \phi + t \cos \phi)\sin \theta = R \cos(\theta - \phi) + t \sin(\theta - \phi) \quad (6)$$

Equation (6) means that when θ=φ, a line always passes through (θ, ρ)=(φ, R) independently of the value of the parameter t that indicates the position on a tangent to a circle. That is, since mapping of tangents to points (x, y)=(R cos φ, R sin φ) on the circumference of the radius R to the θρ space by Hough transformation passes through (θ, ρ)=(φ, R) for all parameters t, (θ, ρ)=(φ, R) has an element of a maximum value.

Figure 5:
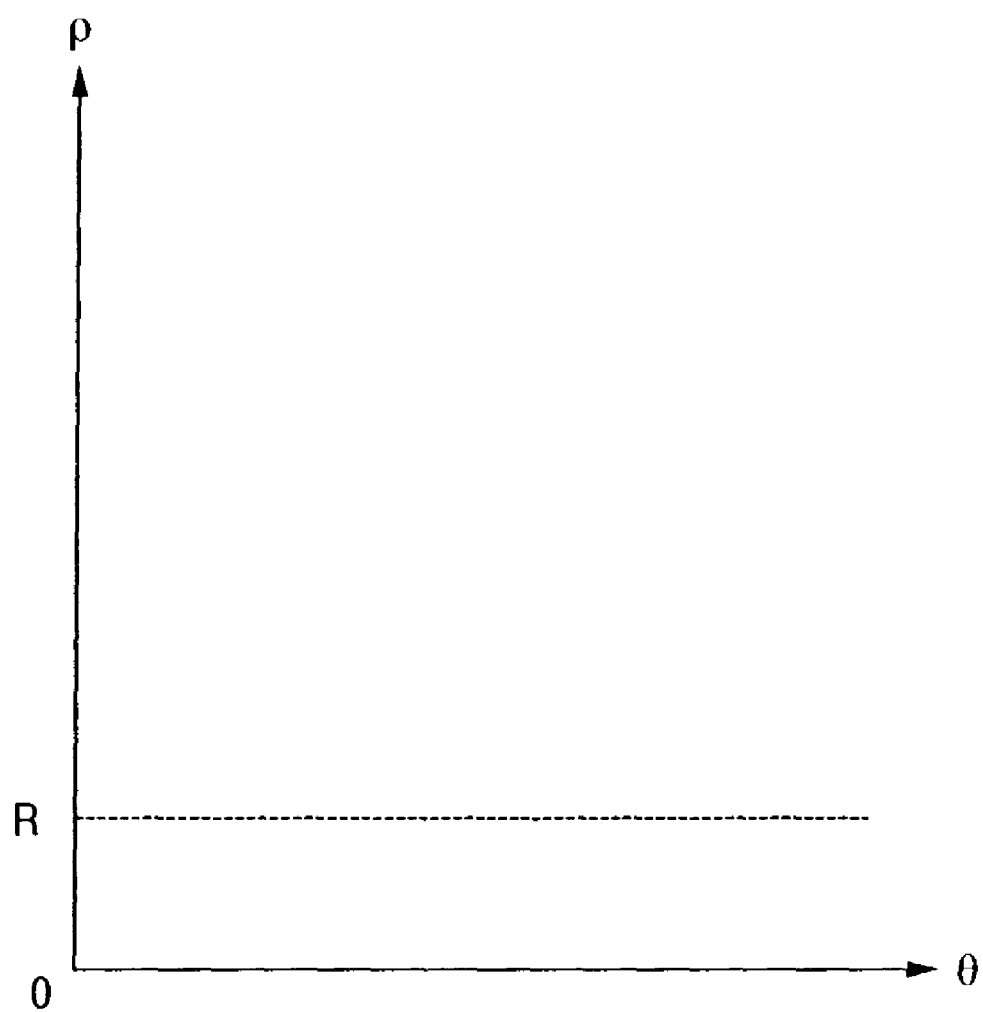
FIG. 5 is a view for explaining the calculation result of mapping to the θρ space by Hough transformation of a figure shown in FIG. 1.

FIG. 5 is a view for explaining the calculation result of mapping to the θρ space by Hough transformation of the figure shown in FIG. 1. Note that FIG. 5 represents only a case wherein ρ is positive. As shown in FIG. 5, tangents to points on a circle when φ=0, 10, 20, . . . , 350° respectively correspond to peaks of (θ, ρ)=(φ, R) on the θρ space.

Upon drawing a tangent from a point (x, y)=(R cos φ, R sin φ) on the circumference of the radius R, 1-bit information is embedded. In this case, the embedded 1-bit information can be extracted from peak values which line up at given intervals on $\rho=R$ obtained by mapping from the xy space to the $\theta\rho$ space. More specifically, a basic pattern that makes the envelope of a plurality of lines, each of which corresponds to 1-bit information, define a circle can serve as a basic pattern used to keep multi-bit information secret. Hough transformation to the $\theta\rho$ space can serve as a basic process upon extracting additional information from the pattern.

The influences on mapping to the $\theta\rho$ space by Hough transformation when the figure based on the basic pattern shown in FIG. 1 undergoes rotation and scaling will be examined below. From equation (6), when the figure based on the basic pattern shown in FIG. 1 has undergone rotation ($\phi \rightarrow \phi+\Delta\phi$), the $\phi$-coordinates of the peak appearance positions are merely translated ($\phi \rightarrow \phi+\Delta\phi$) in the Hough transformation result to the $\theta\rho$ space.

Figure 6:
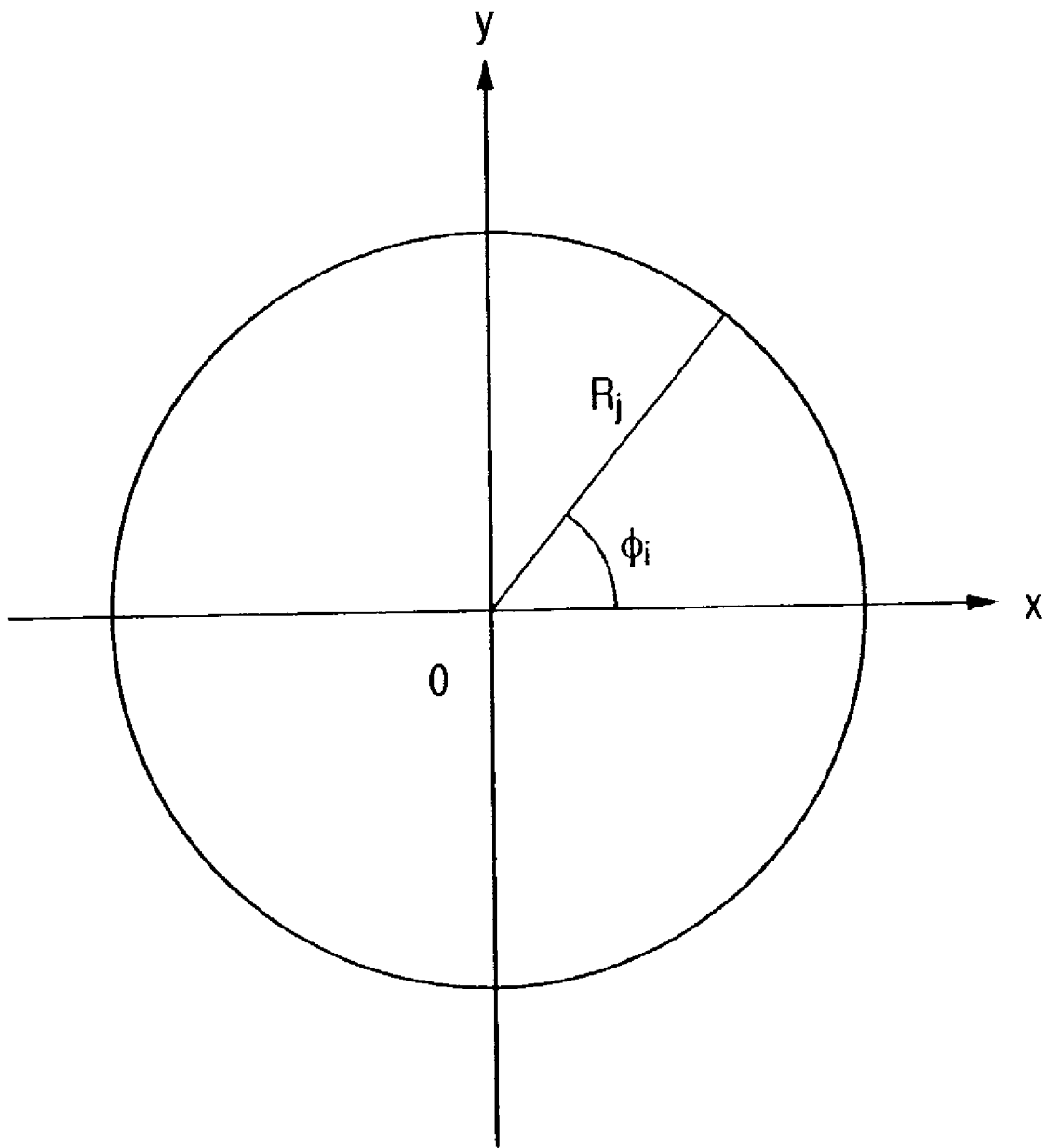
FIG. 6 is a polar plot representation for expressing a position ($\phi_1$, $R_j$) on the circumference of a circle with a radius $R_j$.

Likewise, when the figure based on the basic pattern shown in FIG. 1 has undergone scaling ($R \rightarrow aR$), the $\rho$-coordinate of the appearance position of the peak array is merely translated ($R \rightarrow aR$) in the Hough transformation result to the $\theta\rho$ space. That is, even when the figure based on the basic pattern shown in FIG. 1 has undergone conversion/edit processes such as rotation, scaling, and the like, extraction can be easily done. As can be seen from features of Hough transformation, 1-bit information need not always correspond to one line, but can be a point array consisting of a plurality of points on a line. In order to allow to embed a large number of bits of information, the basic pattern that makes the envelope of a plurality of lines define a circle is expressed by:

$$x = R_j \cos \phi_i - t_m \sin \phi_1 \quad (7)$$

$$y = R_j \cos \phi_1 - t_m \sin \phi_i \quad (8)$$

where x and y are respectively the x- and y-coordinate positions of a watermark pattern. FIG. 6 is a polar plot representation for expressing a position ($\phi_i$, $R_j$) on the circumference of a circle of a radius $R_j$. Note that $t_m$ is a parameter used to express a point on a line.

Figure 7:
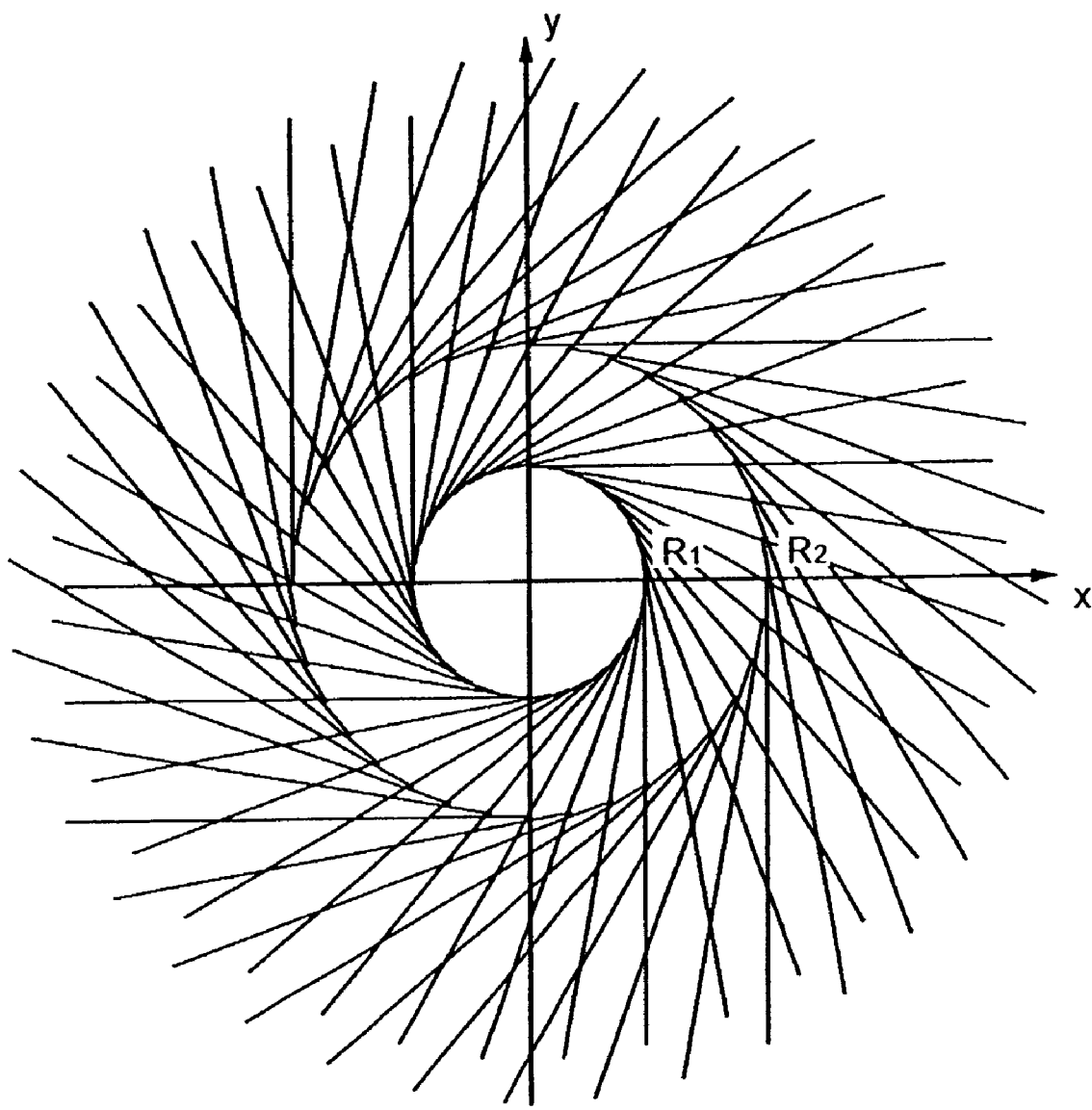
FIG. 7 is a view for explaining basic patterns obtained by drawing a plurality of tangents to two circles having radii R1 and R2.
Figure 8:
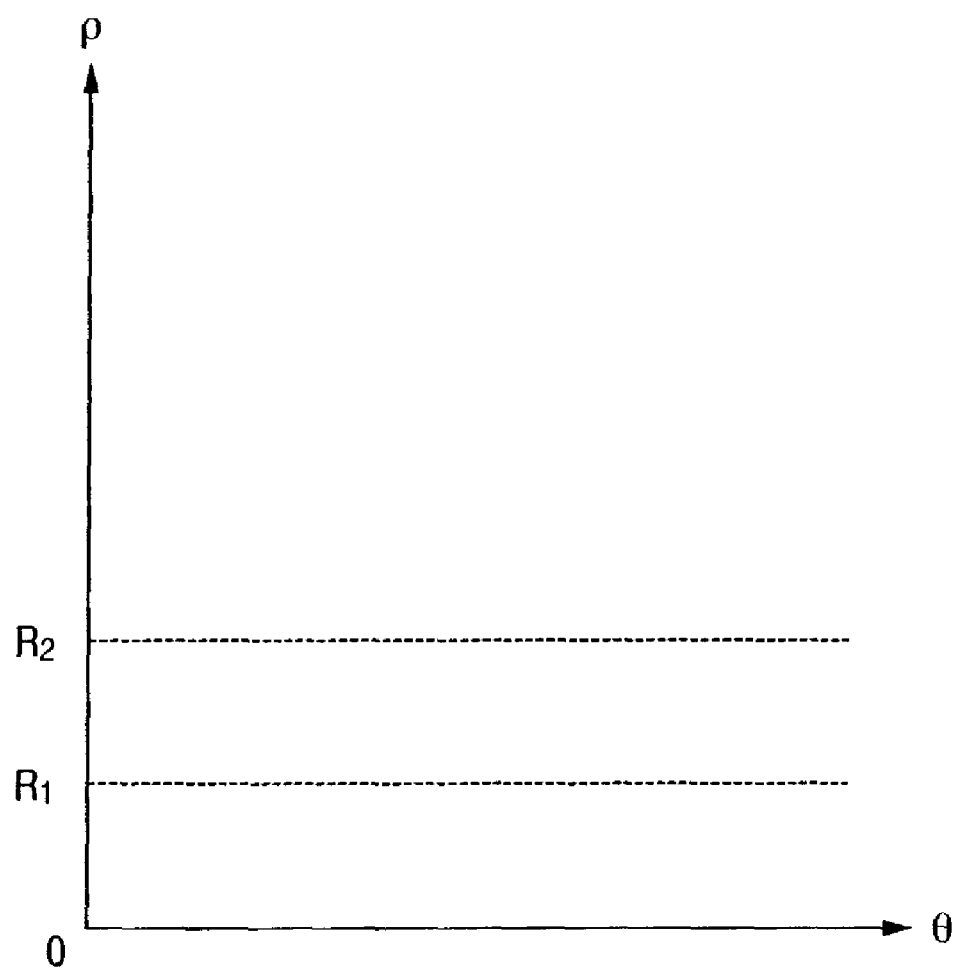
FIG. 8 is a view for explaining Hough transformation of the two different basic patterns shown in FIG. 7 to the θρ space.

Furthermore, by drawing a plurality of tangents from a plurality of circles R1 and R2 with different radii, the robustness can be improved by redundantly embedding information, and the information size can be increased. FIG. 7 is a view for explaining basic patterns obtained by drawing a plurality of tangents to two circles having radii R1 and R2. FIG. 8 is a view for explaining Hough transformation of the two different basic patterns shown in FIG. 7 to the $\theta\rho$ space. Note that FIG. 8 represents only a case wherein $\rho$ is positive. As shown in FIG. 8, even when a plurality of tangents form a plurality of circles, peaks of mapping to the $\theta\rho$ space by Hough transformation can be extracted, thus increasing the redundancy and size of information.

An example of a method of determining correspondence between n-bit additional information $b_i$ (i=1, 2, ..., n) made up of numerical values of 1 or 0, and a line will be explained below. Note that the relationship between the information $b_i$ and the line serves as key information upon extracting information, and various other correspondence determination methods may be used in addition to the method to be described below.

One bit is added to the head of the n-bit additional information $b_1$ to obtain (n+1)-bit information. Assume that the 1-bit information added to the head is a start bit s1 which is a special bit indicating the start position, and always assumes 1. Each bit $b_i$ of the additional information and the line are related based on:

$$\phi_i = p \times i \times b_1 + q \quad (9)$$

where i is the order of bit information, p is the angular interval, and q corresponds to a line corresponding to the start bit s1. Assume that the line corresponding to the start bit s1 has an identifiable feature compared to lines corresponding to other bits.

In this embodiment, the pattern which is described by equations (7) and (8) and makes the envelope of a set of lines define a circle will be referred to as an "envelope ring pattern". Application examples of an image processing apparatus for embedding various kinds of additional information using the envelope ring pattern will be explained below.

First Embodiment

The first embodiment applies an envelope ring pattern onto a Fourier amplitude spectrum that has undergone discrete Fourier transformation, and implements digital watermarking which is robust against conversion/edit processes such as rotation, scaling, and translation. As described above, by putting the envelope ring pattern on the Fourier amplitude pattern of an original image, the influence of translation can be ignored.

Also, since rotation ($\Delta\phi$) and scaling (ax) of an image become rotation ($\Delta\phi$) and scaling (frequency=1/a times, amplitude=1/a) of the Fourier amplitude spectrum due to the fundamental nature of Fourier transformation, the nature of Hough transformation of the envelope ring pattern can be directly applied. Note that lines must be arranged to satisfy symmetry of the amplitude spectrum of Fourier transformation.

Figure 9:
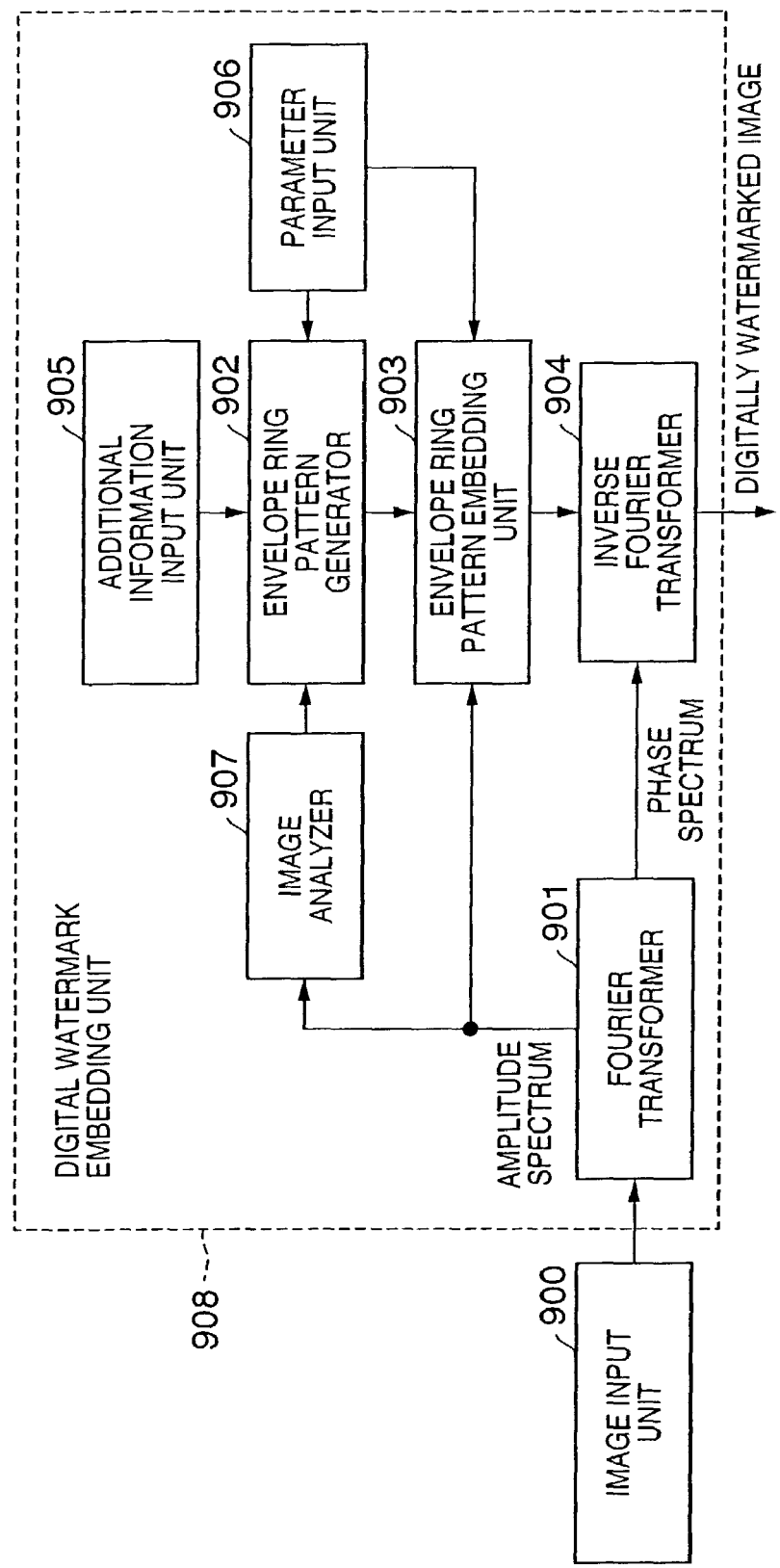
FIG. 9 is a block diagram showing the arrangement of an image processing apparatus for embedding a digital watermark according to an embodiment of the present invention.

Embedding of additional information in a digital image, and extraction of the embedded additional information from the digital image will be described in detail below. FIG. 9 is a block diagram showing the arrangement of an image processing apparatus for embedding a digital watermark according to an embodiment of the present invention. The image processing apparatus shown in FIG. 9 is roughly constituted by an image input unit 900 and digital watermark embedding unit 908.

Referring to FIG. 9, an image input unit 900 is a device for inputting a digital image in which additional information is to be embedded, and is connected to a Fourier transformer 901. The Fourier transformer 901 is a device for computing the Fourier transforms of an input digital image, and is connected to an image analyzer 907, envelope ring pattern embedding unit 903, and inverse Fourier transformer 904. The image analyzer 907 is a device for analyzing an image, and is connected to an envelope ring pattern generator 902. In this embodiment, Fourier transformation is used as an example of frequency transformation.

An additional information input unit 205 is a device for inputting additional information (digital watermark information) to be embedded in a digital image, and is connected to the envelope ring pattern generator 902. A parameter input unit 906 is a device for inputting a parameter which changes depending on the watermark strength or for each embedding, and is connected to the envelope ring pattern generator 902 and envelope ring pattern embedding unit 903.

The parameter that changes for each embedding includes environmental information such as a user ID, time information, the model number of hardware used in embedding, the serial number of software, the position of a block in an image where additional information is to be embedded, and the like. FIG. 20 shows a repetitive embedding state of additional information. Upon repetitively embedding additional information in an image, a plurality of blocks 2201, each of which serves as a minimum embedding unit, are arranged on an image 2001 in a tile pattern, as shown in FIG. 20. Note that the position of a block indicates the location or coordinates of the block.

The envelope ring pattern generator 902 is a device for generating an envelope ring pattern on the basis of the input additional information and a Fourier amplitude spectrum generated by the Fourier transformer 901. The envelope ring pattern generator 902 is further connected to the envelope ring pattern embedding unit 903.

The envelope ring pattern embedding unit 903 is a device for embedding an envelope ring pattern in a Fourier amplitude spectrum on the basis of the Fourier amplitude spectrum generated by the Fourier transformer 901, the envelope ring pattern generated by the envelope ring pattern generator 902, and the parameter which is input from the parameter input unit 906 and changes depending on the watermark strength or for each embedding. The envelope ring pattern embedding unit 903 is further connected to the inverse Fourier transformer 904.

The inverse Fourier transformer 904 is a device for generating an image embedded with a digital watermark (additional information) on the basis of a Fourier phase spectrum generated by the Fourier transformer 901, and the Fourier amplitude spectrum embedded with the envelope ring pattern.

That is, the present invention is directed to an image processing apparatus for embedding digital watermark information in an image to be imperceptible or nearly imperceptible to the human eye, characterized by comprising frequency transformation means (Fourier transformer 901) for computing the frequency transforms of an image to convert the image into amplitude component data and phase component data, embedding pattern generation means (envelope ring pattern generator 902) for generating an embedding pattern of digital watermark information, which is expressed by a set of lines having a predetermined envelope, on the generated amplitude component data, digital watermark information embedding means (envelope ring pattern embedding unit 903) for embedding digital watermark information at predetermined positions on the lines in the embedding pattern, and inverse frequency transformation means (inverse Fourier transformer 904) for computing the inverse frequency transforms of the amplitude component data embedded with the digital watermark information using the phase component data.

Also, the present invention is characterized by further comprising a parameter input unit 906 for inputting a parameter which changes depending on a watermark strength upon embedding the digital watermark information in the image or for each embedding. Furthermore, the present invention is characterized in that the envelope defines a circle.

Figure 10:
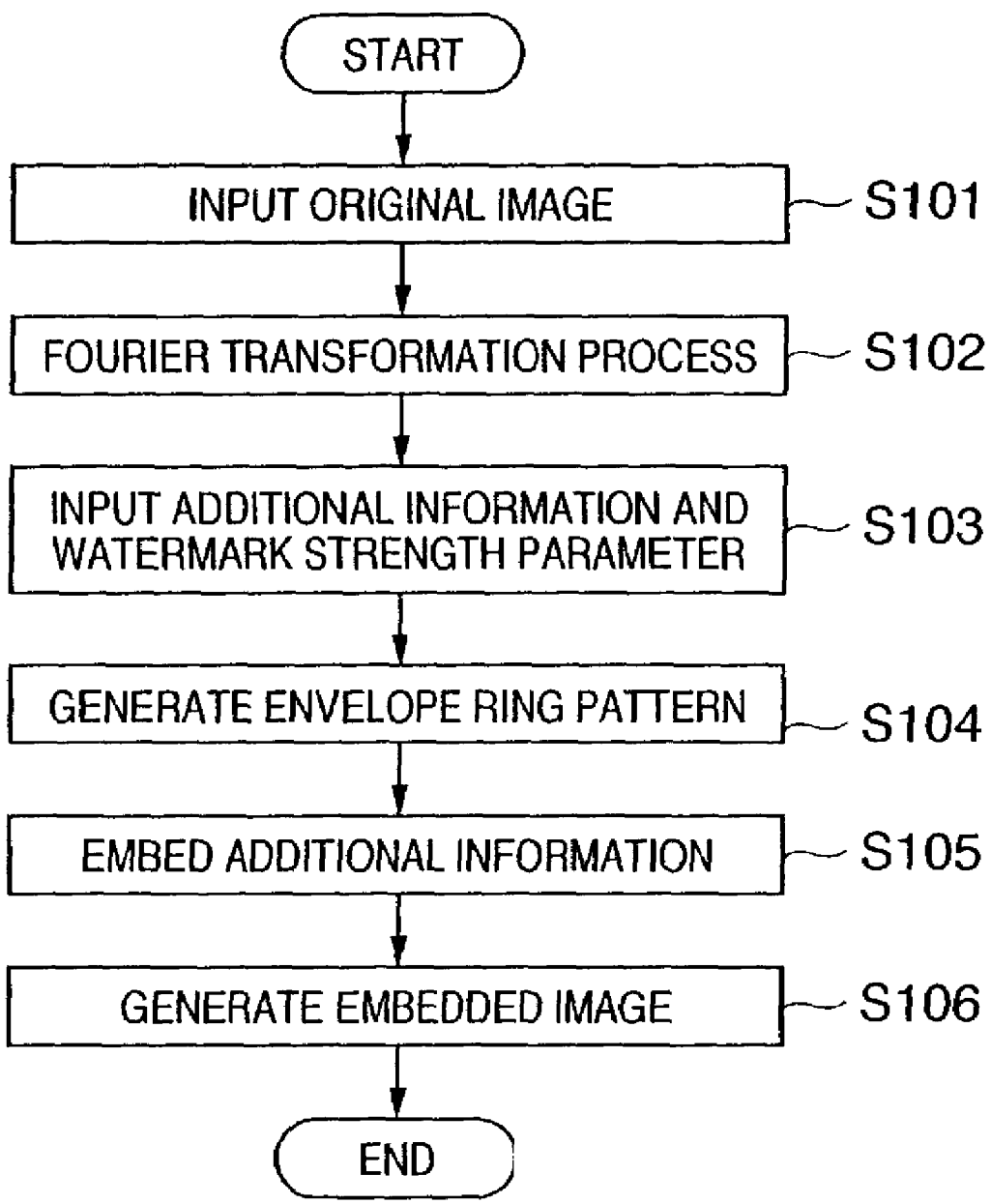
FIG. 10 is a flow chart for explaining the digital watermark embedding sequence of the image processing apparatus according to the embodiment of the present invention.

The operation sequence of the image processing apparatus with the aforementioned arrangement will be explained below. FIG. 10 is a flow chart for explaining the digital watermark embedding sequence of the image processing apparatus of this embodiment. An original image (digital image) is input from the image input unit 900 (step S101). The Fourier transformer 901 computes the Fourier transforms of the input image to generate a Fourier amplitude spectrum and Fourier phase spectrum (step S102).

Furthermore, additional information is input from the additional information input unit 905, and a parameter, which changes depending on the watermark strength or for each embedding, is input from the parameter input unit 906 (step S103). The envelope ring pattern generator 902 determines correspondence between the additional information that contains the start bit s1 and the lines of the envelope ring pattern using equation (9) above and the like. At this time, upon embedding bit information "1", a plurality of embedding positions are selected on a line, corresponding to the bit information, of the envelope ring pattern (step S104). On the other hand, upon embedding bit information "0", no embedding position is selected on a line, corresponding to the bit information, of the envelope ring pattern.

As another method, for both the bit information "1" and bit information "0", a plurality of embedding positions are selected on a line, corresponding to the bit information, of the envelope ring pattern. After that, in an embedding process of the envelop ring pattern embedding unit 903, the Fourier amplitude spectrum is modulated in the positive and negative directions.

The envelope ring pattern generator 902 may change the radius $R_j$ of the circle of the envelope ring pattern in accordance with the Fourier amplitude spectrum of the original image input from the Fourier transformer 901, the parameter which is input from the parameter input unit 906 and changes depending on the watermark strength or for each embedding, and the like, so as to improve the robustness of a digital watermark, and to maintain the image quality of a digitally watermarked image.

Figure 11:
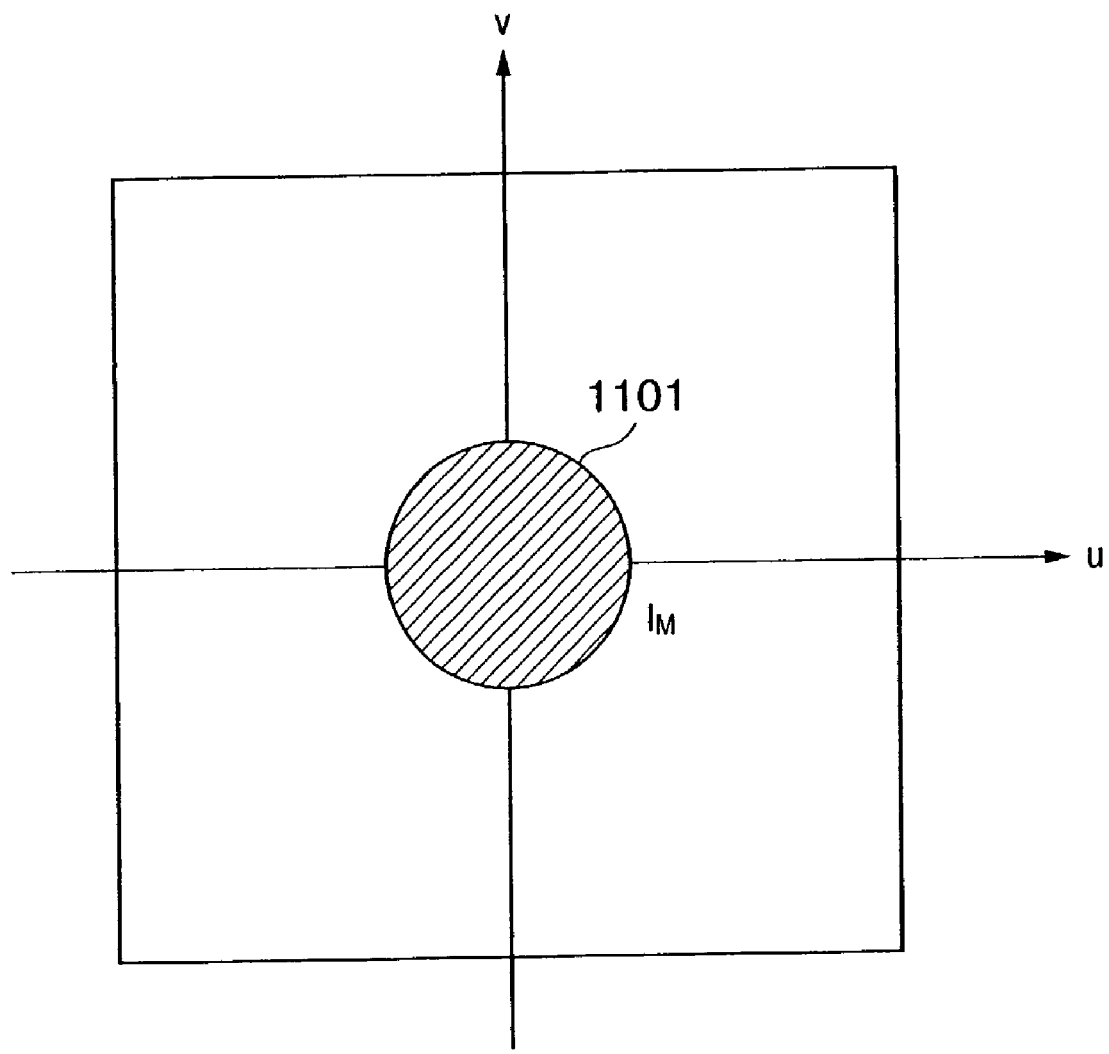
FIG. 11 is a view for explaining a Fourier amplitude spectrum generated by computing the Fourier transforms of an input original image.

A process executed when the radius $R_j$ of the circle of the envelope ring pattern is changed depending on the Fourier amplitude spectrum of the original image using the image analyzer 907 will be explained first. FIG. 11 is a view for explaining a Fourier amplitude spectrum generated by computing the Fourier transforms of an input original image. Referring to FIG. 11, an inner portion of (hatched portion) a circle 1101 of a radius $I_M$ includes a relatively strong amplitude spectrum.

When the radius $R_j$ of the circle of the envelope ring pattern is smaller than the boundary (the circle 1101 of the radius $I_M$) with the inner portion of the radius $I_M$ that includes a relatively strong amplitude spectrum, a feature of the original image may be lost by embedding the envelope ring pattern. Also, upon extracting bit information, any extraction errors may occur under the influence of the original Fourier amplitude spectrum of the image. For this reason, the envelope ring pattern generator 903 changes the radius $R_j$ of the circle of the envelope ring pattern in accordance with the Fourier amplitude spectrum of an input original image so as to satisfy $R_j \geq I_M$. Note that the image analyzer 907 is not an indispensable function, and may be used as needed.

A case will be described below wherein the robustness of a watermark is changed by changing the radius $R_j$ of the circle of the envelope ring pattern in accordance with a watermark strength parameter input from the parameter input unit.

Against JPEG compression and a print & scan process (a digitally watermarked image is printed, and the print image is scanned again to detect a watermark) which have an effect like a low-pass filter, the robustness can be improved by reducing the radius $R_j$ of the circle of the envelope ring pattern, and embedding the envelope ring pattern in low-frequency components. Since a change in high-frequency component is nearly imperceptible to a human being, if a high watermark strength is not required, the radius $R_j$ of the circle of the envelope ring pattern may be increased.

As described above, by changing the radius $R_j$ of the circle of the envelope ring pattern, the watermark strength can be changed in accordance with the watermark strength parameter. In this way, the envelope ring pattern can select corresponding frequency components of the Fourier amplitude pattern in which that pattern is to be embedded by changing the radius $R_j$ of the circle.

On the other hand, the number of embedding points on a line of the envelope ring pattern, which corresponds to each bit of the additional information, may be changed in accordance with the watermark strength parameter input from the parameter input unit 906. Each line of the envelope ring pattern need not always be a perfect line in terms of the characteristics of Hough transformation, but embedding points enough to detect a line upon executing Hough transformation need only be present on the line. This manipulation amounts to increasing the number of embedding points $t_m$ in equations (7) and (8).

Furthermore, the radius $R_j$ of the circle of the envelope ring pattern and the positions and number of embedding points $t_m$ on each line of the envelope ring pattern may be randomly changed in accordance with various parameters such as additional information that changes for each embedding, time information, the user ID, and the like. With this process, the embedded position of a watermark becomes harder to recognize. A position signal used to determine geometrical transformation applied to an image is often used as a common signal. The aforementioned manipulation can prevent a common signal from being analyzed easily.

With the conventional digital watermarking technique, since the embedded positions of an information signal $b_1$ and alignment signal s1 are fixed, once the embedded positions are uncovered, it becomes easy to remove the information signal and alignment signal, and an image may be externally tampered with. However, when the embedded positions are varied depending on the additional information and the embedding timing, removal of a digital watermark can be made harder. Note that the start bit s1 is set to be identifiable from other pieces of additional information $b_1$ by, e.g., increasing the number of embedding points $t_m$ on a line of the envelope ring pattern, which corresponds to the start bit s1.

After that, the envelope ring pattern embedding unit 903 generates an isolated point at a position determined by the envelope ring pattern generator 902 for the Fourier amplitude spectrum of the original image (step S105). Assume that the isolated point has a value different from surrounding points. The process to be executed by the envelope ring pattern embedding unit 903 will be described in detail below.

The envelope ring pattern embedding unit 903 changes Fourier amplitude spectrum portions of the original image, which correspond to embedding positions corresponding to respective pieces of bit information determined by the envelope ring pattern generator 902. FIG. 12 is a view for explaining a change process of the Fourier amplitude spectrum done by the envelope ring pattern embedding unit 903. Referring to FIG. 12, a graph denoted by reference numeral 1201 linearly represents the values of the Fourier amplitude spectrum of the original image for the purpose of easy understanding of the process in the envelope ring pattern embedding unit 903.

The envelope ring pattern embedding unit 903 increases the amplitude of the Fourier amplitude spectrum of the original image, which corresponds to an embedding position r' corresponding to each bit information, like an amplitude component at a position r' in a graph denoted by reference numeral 1202. More specifically, the Fourier amplitude spectrum at the embedding position r' is positively (or negatively) changed so as to minimize the influence on the image quality of the original image and to be recognized as an isolated point compared to surrounding pixels in consideration of the Fourier amplitude spectrum distribution around the embedding position r'. At this time, when a watermark strength parameter is input from the parameter input unit 906, the change amount is adjusted in accordance with that watermark strength parameter.

If information is embedded in a point on the axis of the Fourier amplitude spectrum, a relatively perceptible pattern may be generated. Hence, the envelope ring pattern generator 902 may select the embedding position so as not to form an isolated point on the axis.

Finally, the inverse Fourier transformer 904 generates a digitally watermarked image using the Fourier amplitude spectrum embedded with the envelope ring pattern, and the Fourier phase spectrum input from the Fourier transformer 901 (step S106). The operation sequence of the image processing apparatus for embedding a digital watermark according to the present invention has been explained.

Figure 13:
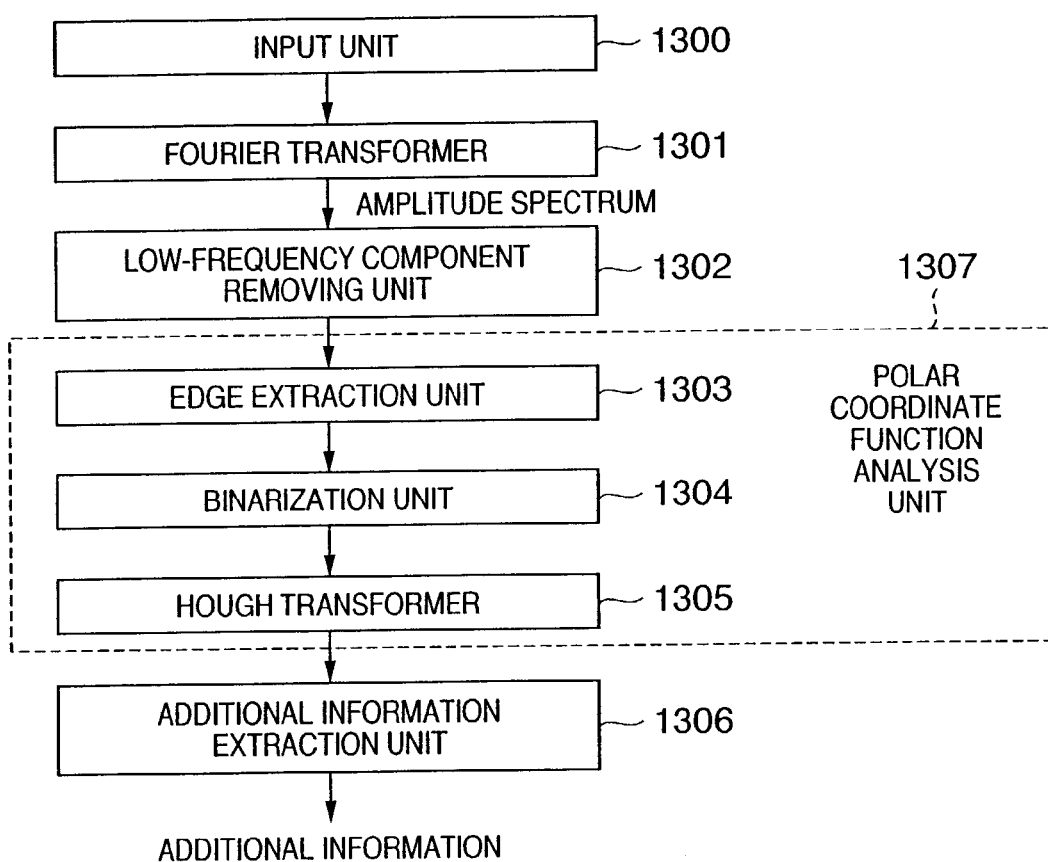
FIG. 13 is a block diagram showing the arrangement of an image processing apparatus for extracting a digital watermark according to the embodiment of the present invention.

An image processing apparatus for extracting a digital watermark from an image in which the digital watermark has been embedded in the aforementioned sequence will be explained below. FIG. 13 is a block diagram showing the arrangement of an image processing apparatus for extracting a digital watermark according to this embodiment.

An input unit 1300 is a device for inputting an image embedded with a digital watermark generated in the aforementioned sequence, and is connected to a Fourier transformer 1301. The Fourier transformer 1301 is a device for computing the Fourier transforms of the input digitally watermarked image, and is connected to a low-frequency component removing unit 1302. The low-frequency component removing unit 1302 is a device for removing the low-frequency region of the Fourier amplitude spectrum, and is connected to a polar coordinate function analyzer 1307.

The polar coordinate function analyzer 1307 comprises an edge extraction unit 1303, binarization unit 1304, and Hough transformer 1305 in the first embodiment.

The edge extraction unit 1303 is a device for executing an edge detection process in the image using a differential filter such as a Laplacian filter or the like, and is connected to the binarization unit 1304. The binarization unit 1304 binarizes an edge image using a threshold value, and is connected to the Hough transformer 1305. The Hough transformer 1305 executes the aforementioned Hough transformation process for a binary image. The polar coordinate function analyzer 1307 is connected to an additional information extraction unit 1306. The additional information extraction unit 1306 is a device for extracting additional information embedded in an image.

That is, the present invention is directed to an image processing apparatus for extracting digital watermark information from an image in which digital watermark information is embedded at predetermined positions on lines having a predetermined envelope so as to be imperceptible or nearly imperceptible to the human eye, characterized by comprising a polar coordinate function analyzer 1307 for calculating an extremum in the image, and digital watermark information extraction means (additional information extraction unit 1306) for extracting the digital watermark information embedded in the image from the position of the calculated extremum.

Also, the present invention is characterized in that the polar coordinate function analyzer 1307 comprises embedded position detection means (edge extraction unit 1303) for detecting the embedded positions of the digital watermark information, a binarization unit 1304 for generating a binary image made up of pixels at the embedded positions detected in the image in which the digital watermark information is embedded to be imperceptible or nearly imperceptible to the human eye, and remaining pixels in the image, and a Hough transformer 1305 for generating a Hough transformed image by computing the Hough transforms of the generated binary image.

The present invention is characterized by further comprising frequency transformation means (Fourier transformer 1301) for generating amplitude component data by computing the frequency transforms of the image in which the digital watermark information is embedded to be imperceptible or nearly imperceptible to the human eye, and a low-frequency component removing unit 1302 for removing a low-frequency component from the generated amplitude component data, and in that the embedded digital watermark information is extracted from the image from which the low-frequency component has been removed.

Figure 14:
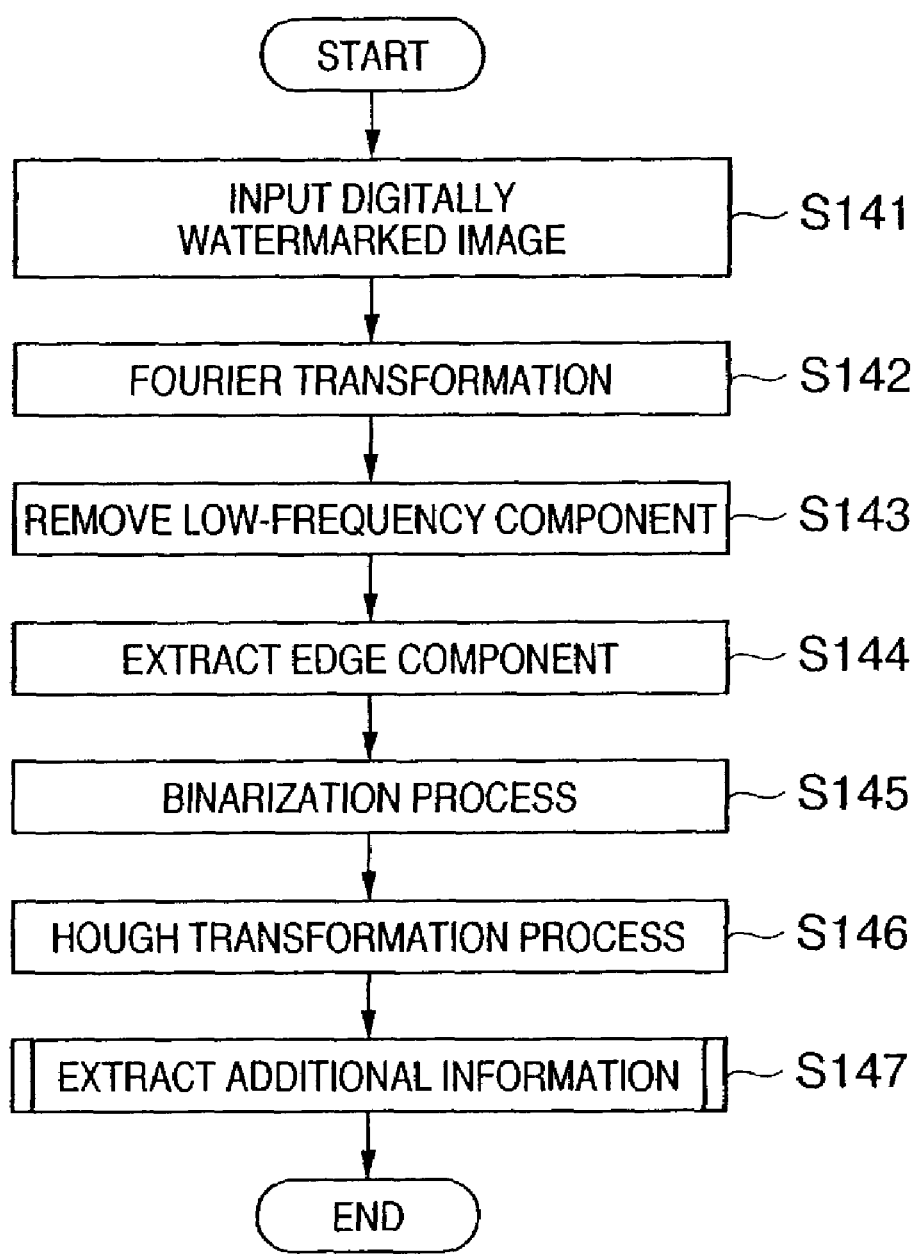
FIG. 14 is a flow chart for explaining the operation sequence of the image processing apparatus for explaining additional information shown in FIG. 13.

The operation sequence of the image processing apparatus shown in FIG. 13 will be described below with reference to the accompanying drawings. FIG. 14 is a flow chart for explaining the operation sequence of the image processing apparatus for extracting additional information shown in FIG. 13. The input unit 1300 inputs a digitally watermarked image (step S141). The Fourier transformer 1301 computes the Fourier transforms of the input digitally watermarked image, thus generating a Fourier amplitude spectrum (step S142).

The generated Fourier amplitude spectrum is input to the low-frequency component removing unit 1302, which removes the low-frequency region of the Fourier amplitude spectrum, in which the influences of frequency components unique to the image are large, and the envelope ring pattern is unlikely to be present (step S143). Note that the low-frequency component removing unit 1302 is means which is introduced to remove the influences of frequency components unique to the image, and is not a device that executes an indispensable process. That is, this low-frequency component removing unit 1302 is added to improve the extraction precision of the additional information.

The Fourier amplitude spectrum from which the low-frequency component has been removed undergoes an edge detection process using a differential filter such as a Laplacian filter or the like by the operation of the edge extraction unit 1303 (step S144). FIG. 15 is a view for simply explaining the processing contents of the edge extraction unit 1303 in the image processing apparatus. Note that the example of FIG. 15 adopts linear representation for the sake of simplicity of the description of the processing contents.

Referring to FIG. 15, a graph denoted by reference numeral 1501 shows the edge detection result from the Fourier amplitude spectrum, in which no digital watermark is embedded, as denoted by reference numeral 1201 in FIG. 12, using a differential filter such as a Laplacian filter or the like. Reference numeral 1502 denotes a graph that shows the edge detection result from the Fourier amplitude spectrum in which the digital watermark is embedded, as denoted by reference numeral 1202 in FIG. 12, using the differential filter (Laplacian filter or the like). Note that the envelope ring pattern embedding unit 903 of the image processing apparatus for embedding a digital watermark has embedded the envelope ring pattern to be detected as an edge, as described above.

The edge-detected image is input to the binarization unit 1304, which executes a binarization process using a predetermined threshold value (step S145). In this case, the image data that has undergone the edge detection process, as denoted by reference numeral 1502 in FIG. 15, undergoes a binarization process using a given threshold value 1503. That is, a binary image is generated by setting the edge-detected image data that exceeds the threshold value 1503 to be 1, and setting image data equal to or lower than the threshold value to be 0.

The generated binary image is input to the Hough transformer 1305, which executes the aforementioned Hough transformation process to generate a mapped image to the $\theta\rho$ space (step S146). The Hough transformer 1305 makes mapping of the binary image to the $\theta\rho$ space by Hough transformation, and an edge position that exceeds the threshold value is drawn as a sine curve in the $\theta\rho$ space.

The generated mapped image is input to the additional information extraction unit 1306, which extracts the embedded additional information from a peak point array in the mapped image to the $\theta\rho$ space (step S147). For example, the additional information extraction unit 1306 receives a Hough transformed image denoted by reference numeral 1601 in FIG. 16, and extracts additional information from that image. FIG. 16 shows an example of a Hough transformed image used in an explanation of the internal process of the additional information extraction unit 1306. As denoted by reference numeral 1601 in FIG. 16, if the envelope ring pattern is embedded, a plurality of peaks appear on a line $\rho=R'$.

Figure 17:
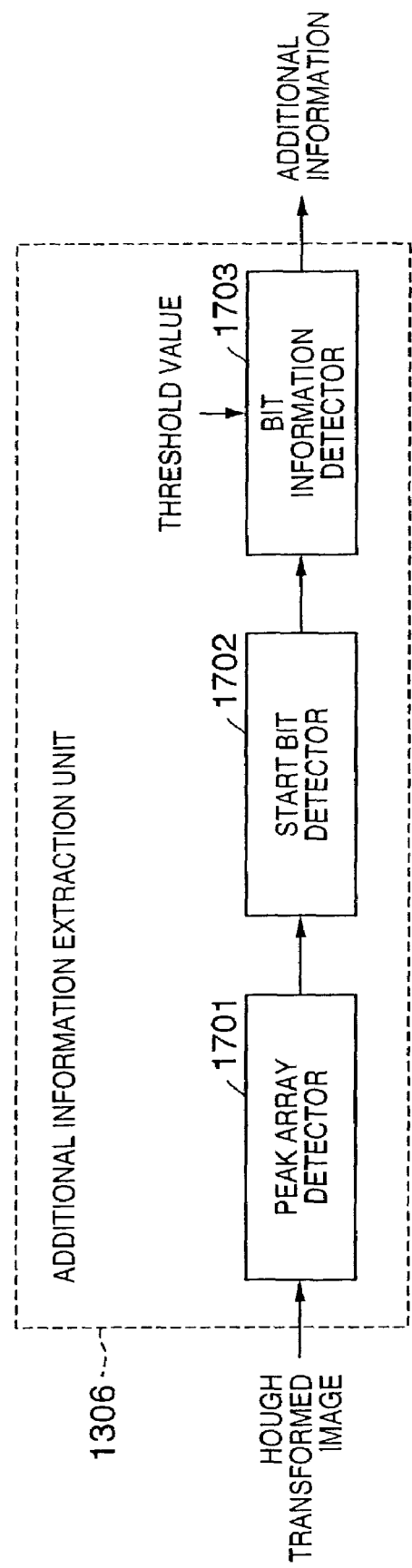
FIG. 17 is a block diagram showing the detailed arrangement of the additional information extraction unit 1306.

FIG. 17 is a block diagram showing the detailed arrangement of the additional information extraction unit 1306. As shown in FIG. 17, the additional information extraction unit 1306 comprises a peak array detector 1701 for detecting a peak array from the input Hough transformed image, a start bit detector 1702 for detecting the start bit s1, and a bit information detector 1703 for acquiring bit information on the basis of a threshold value.

Figure 18:
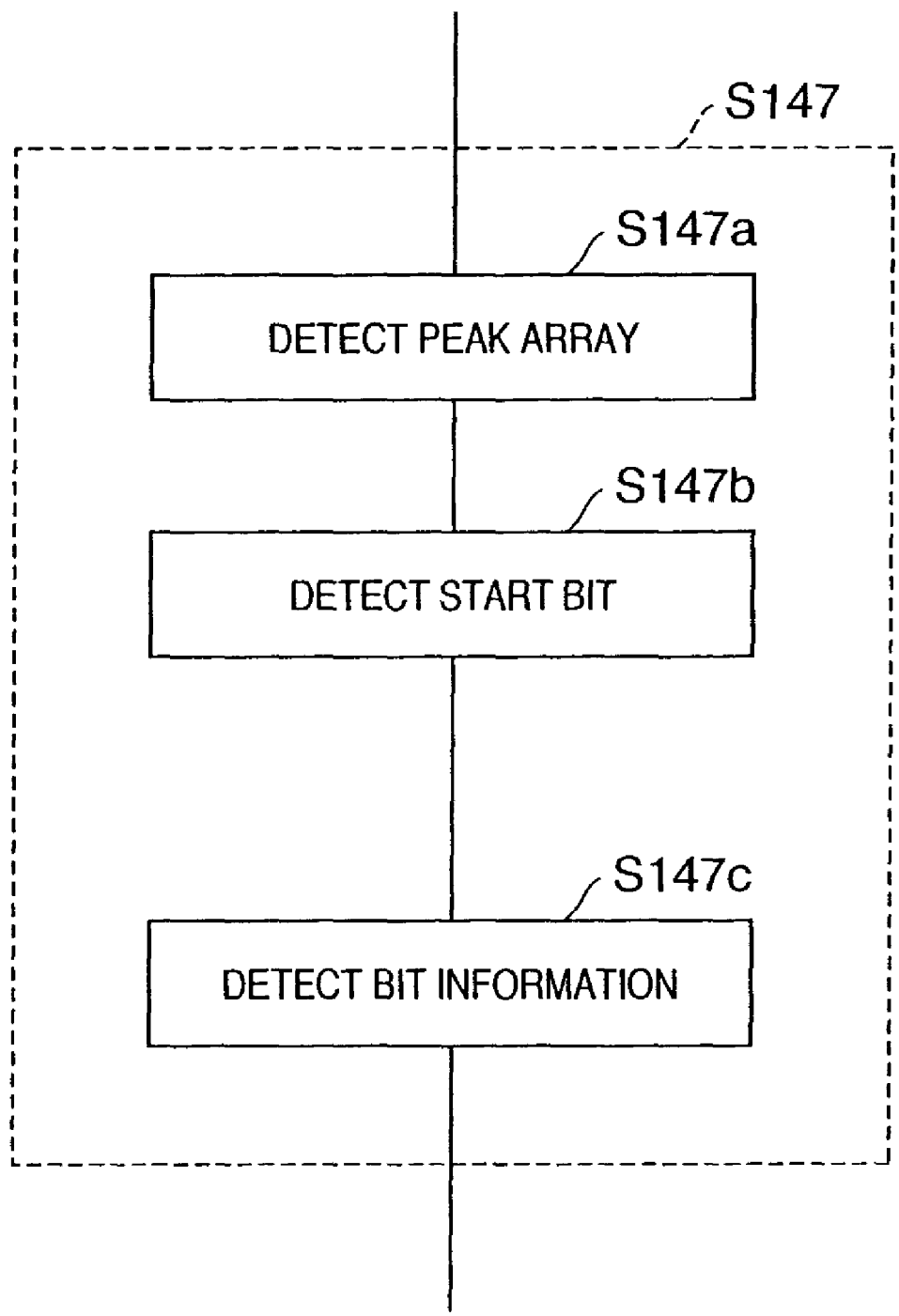
FIG. 18 is a flow chart for explaining the operation sequence of the additional information extraction unit 1306.

FIG. 18 is a flow chart for explaining the operation sequence of the additional information extraction unit 1306. The input Hough transformed image is input to the peak array detector 1701. Note that the peak array detector 1701 executes a process for emphasizing peaks for data input from the polar coordinate function analysis means as needed, although not shown. For example, when Hough transformed data is input, a process for emphasizing peaks such as a differential filter process for isolated point extraction, a process for initializing all values to zero except for coordinate values that exceed a predetermined threshold value, or the like is executed. In the following description, assume that Hough transformed image data used in peak extraction has undergone the aforementioned process for emphasizing peaks. The peak array detector 1701 adds up respective components of the Hough transformed image data, which has undergone the peak emphasis process, in a $\rho$ direction. At this time, only a portion $\rho=R'$ is prominent, as denoted by reference numeral 1602. Then, a position $\rho=R'$ where the sum of the components is maximum is detected (step S147*a*). If the original image is a natural image, a relatively large number of lines that extend from the origin of edges or the like (such lines appear in a portion $\rho=0$ upon mapping to the $\theta\rho$ space by Hough transformation) are included, the sum of components of $\rho=0$ may be ignored.

The start bit detector 1702 detects, as a start bit, a position s1 of the largest one of components on the line ρ=R' in the Hough transformed image denoted by reference numeral 1603 (step S147b). Finally, the bit information detector 1703 converts peaks on the line ρ=R' denoted by reference numeral 1603 into respective pieces of bit information on the basis of the relationship between the bit information and lines, which is determined by the envelope ring pattern generator 902 using equation (9) and the like. At this time, whether each bit is 1 or 0 is checked using a given threshold value. The arrangement and operation sequence of the image processing apparatus for extracting a digital watermark have been explained.

As described above, the first embodiment has explained a method of embedding a digital watermark using an envelope ring pattern which is robust against rotation, scaling, translation, and the like, a method of extracting the embedded digital watermark, and image processing apparatuses, which implement these methods. Note that a moving image basically has a format obtained by superposing still images in the time direction. Hence, the present invention is not limited to a still image, and the envelope ring pattern can be applied to a moving image. Therefore, the scope of the present invention includes application of an envelope ring pattern to a moving image as a digital watermark pattern.

When the number of embedding points $t_m$ of the start bit s1 is increased, the peak of the start bit b1 can be larger than those of other additional information in the mapping space of Hough transformation to the θρ space used upon extracting additional information.

Second Embodiment

The first embodiment has explained a case wherein a digital watermark is embedded by changing amplitude spectrum levels at positions represented by an envelope ring pattern in an amplitude spectrum obtained by computing the Fourier transforms of an image. The second embodiment will explain a case wherein a digital watermark is embedded by adding a watermark image, which is obtained by computing the inverse Fourier transforms of an envelope ring pattern and phase spectrum, to an image on the space.

Figure 21:
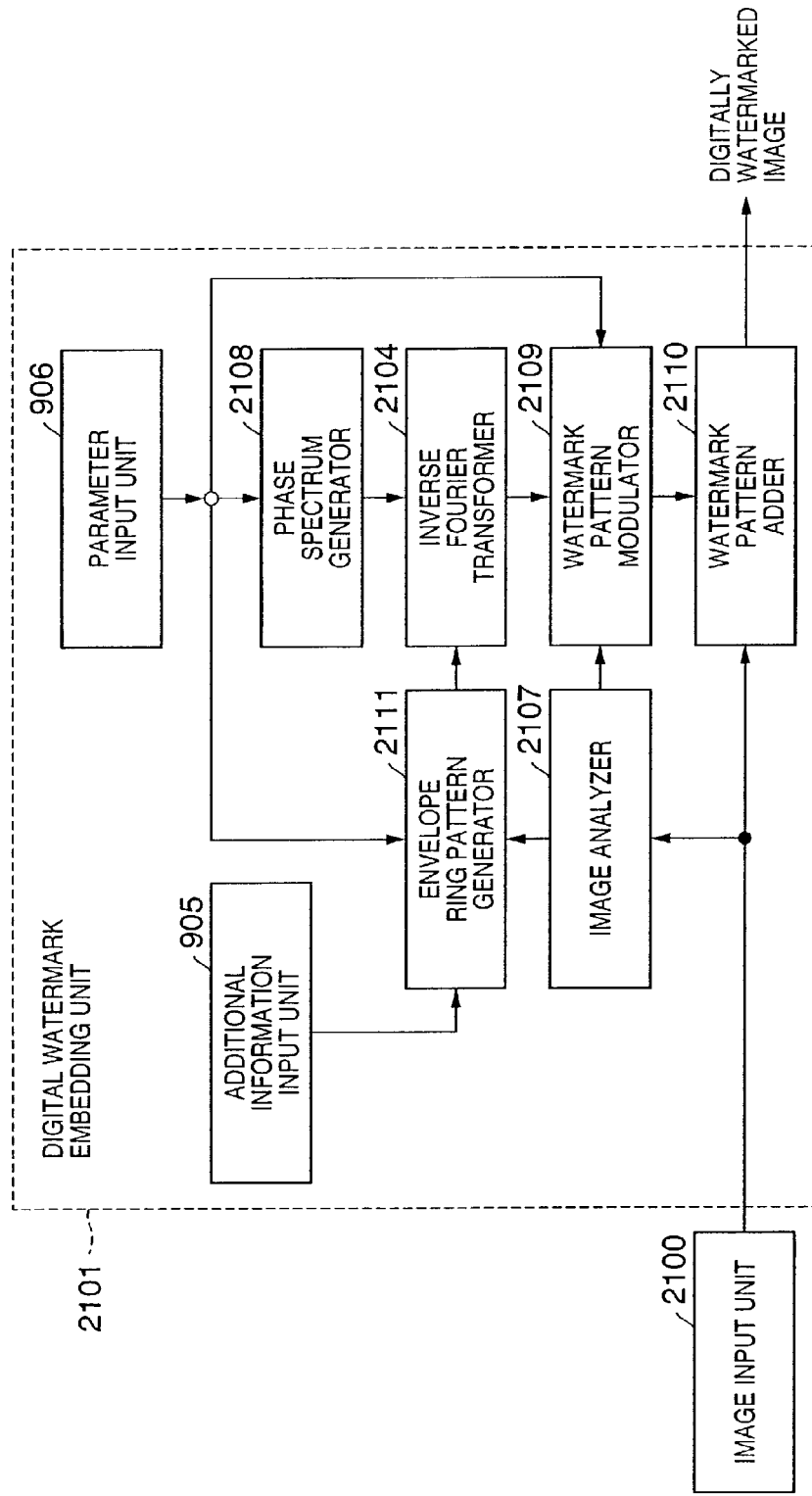
FIG. 21 is a block diagram showing the arrangement of an image processing apparatus for embedding a digital watermark according to an embodiment of the present invention.

FIG. 21 shows digital watermark embedding means corresponding to FIG. 9 in the first embodiment. FIG. 21 is a block diagram showing the arrangement of an image processing apparatus for embedding a digital watermark according to an embodiment of the present invention. The same reference numerals in FIG. 21 denote units having the same functions as those in FIG. 9. A digital watermark embedding unit 2101 shown in FIG. 21 will be explained below.

Image data input by an image input unit 2100 is input to an image analyzer 2107. The image analyzer 2107 analyzes features of the image, and outputs image analysis data as the analysis result to an envelope ring pattern generator 2111. The envelope ring pattern generator 2111 receives additional information that includes a start bit s1 from an additional information input unit 905.

A parameter input unit 906 inputs a parameter, which changes depending on the watermark strength or for each embedding. The functions of the additional information input unit 905 and parameter input unit 906 have been explained in detail in the first embodiment, and a description thereof will be omitted.

The envelope ring pattern generator 2111 generates an envelope ring pattern on the basis of the information input from the additional information input unit 905, parameter input unit 906, and image analyzer 2107.

Figure 22:
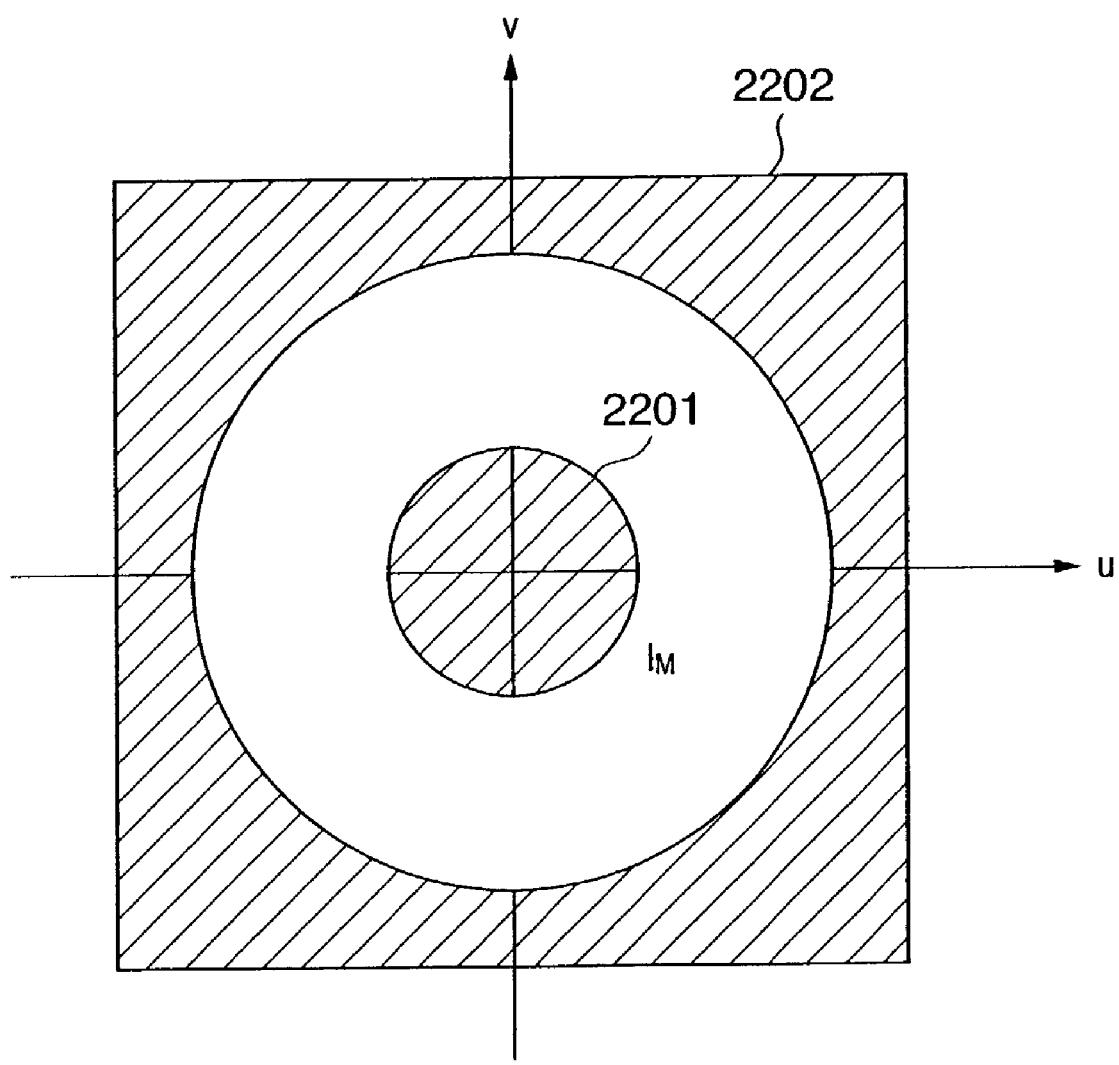
FIG. 22 shows a selection state of embedding positions while avoiding low- and high-frequency regions.

The envelope ring pattern generator 2111 may generate an envelope ring pattern that does not use any positions corresponding to a high-frequency region 2202 of a Fourier amplitude spectrum, as shown in FIG. 22, so as to remove high-frequency components in, e.g., a flat image on the basis of the image analysis data input from the image analyzer 2107. More specifically, as in the first embodiment, positions corresponding to a low-frequency region 2201 may not be used as embedding positions. FIG. 22 shows a selection state of embedding positions while avoiding the low- and high-frequency regions.

The envelope ring pattern generator 2111 shown in FIG. 21 outputs an amplitude spectrum obtained by manipulating amplitude spectrum levels at positions represented by the envelope ring pattern unlike the envelope ring pattern generator 902 in FIG. 9. The amplitude spectrum generated by the envelope ring pattern generator 2111 is input to an inverse Fourier transformer 2104.

A phase spectrum generator 2108 generates a Fourier phase spectrum, and outputs it to the inverse Fourier transformer 2104. The Fourier phase spectrum generated by the phase spectrum generator 2108 may be generated based on a fixed value, or a user ID, time information, or the like input from the parameter input unit 906.

In the present invention, the Fourier phase spectrum is not required upon extracting additional information. Therefore, a watermark pattern on the space can be made harder to recognize by changing the phase spectrum using parameter input information every time that information is input.

The inverse Fourier transformer 2104 generates a watermark pattern that has undergone inverse Fourier transformation on the basis of the amplitude spectrum input from the envelope ring pattern generator 2111 and the phase spectrum input from the phase spectrum generator 2108, and inputs it to a watermark pattern modulator 2109.

The watermark pattern modulator 2109 modulates the watermark pattern on the basis of the image analysis data input from the image analyzer 2107, the digital watermark pattern input from the inverse Fourier transformer 2104, and the watermark strength input from the parameter input unit 906. The watermark pattern modulator 2109 outputs the modulated watermark pattern to a watermark pattern adder 2110.

The watermark pattern adder 2110 adds the modulated watermark pattern to the original image, and outputs a digitally watermark image. Note that the image analysis data input from the image analyzer 2107 to the envelope ring pattern generator 2111, and that input to the watermark pattern modulator 2109 are those obtained based on image analysis, and may be different data.

That is, the present invention is directed to an image processing apparatus for embedding digital watermark information in an image to be imperceptible or nearly imperceptible to the human eye, characterized by comprising an image input unit 2100 for inputting frequency-transformed image data, phase component generation means (phase spectrum generator 2108) for generating phase component data using a predetermined parameter, inverse frequency transformation means (inverse Fourier transformer 2104) for generating a watermark pattern on the basis of amplitude component data obtained from the input image data, and the phase component data, a watermark pattern modulator 2109 for modulating the amplitude component data and watermark pattern, and a watermark pattern adder 2110 for adding the modulated watermark pattern to the input image data.

As described above, the second embodiment has explained a method of generating a digitally watermarked image by generating a watermark pattern expressed in the spatial domain using an envelope ring pattern, and adding it to an input image in the spatial domain.

Third Embodiment

In the description of the first embodiment, the internal arrangement of the polar coordinate function analyzer 1307 comprises the edge extraction unit 1303, binarization unit 1304, and Hough transformer 1305, as shown in FIG. 13. In the third embodiment, the internal process of the polar coordinate function analyzer 1307 is implemented using another method.

A case will be examined below wherein the sums of pixel values (the values of an amplitude spectrum) on tangents to a circle at polar coordinates ($\theta$, $\rho$) is calculated for an envelope ring pattern shown in FIG. 1 or 7, and are plotted on polar coordinates ($\theta$, $\rho$). In this case, nearly the same result as the mapped images to the $\theta\rho$ space shown in FIGS. 5 and 8 can be obtained. Such result is intuitively recognizable since the process of Hough transformation indirectly calculates power on a line to detect the line.

As has been explained in the first embodiment, Hough transformation can also detect circles and geometrical figures expressed by formulas. Therefore, the aforementioned extraction method and the first embodiment can be generalized as follows.

Information can be embedded by changing the pixel values of points (values of an amplitude spectrum) on a function given by a formula based on points ($\phi_1$, $R_j$) on the polar coordinates, and additional information can be extracted based on the positional relationship of peaks of analysis data, which is generated by analyzing points on the function given by the formula based on the points ($\phi_1$, $R_j$), and is expressed by the polar coordinates.

In case of the third embodiment, analysis of points on the function given by the formula based on the points on the polar coordinates amounts to calculating the sum of pixel values on the formula (amplitude spectrum values). In the third embodiment, no isolated point need be generated upon embedding, and the sum of pixel values on each tangent to the circle need only be larger than other values. The third embodiment has been explained.

Fourth Embodiment

In the first and second embodiments, the start bit s1 and additional information bi (i=1, 2, . . . , n) are embedded in the Fourier amplitude spectrum using the envelope ring pattern. The first and second embodiments implement digital watermarking which is robust against geometrical attacks such as rotation, scaling, translation, and the like using the start bit s1 as an alignment signal.

As described above, in the first and second embodiments, embedded additional information is extracted without restoring an original geometrical state of an image. However, in this embodiment, assume that additional information bi (i=1, 2, . . . , n) is embedded using another algorithm which has no robustness against any geometrical attacks, and the original geometric state of an image must be detected upon extracting additional information from the image.

FIG. 23 is a block diagram showing the arrangement of an image processing apparatus for embedding a digital watermark according to an embodiment of the present invention. An image processing apparatus shown in FIG. 23 is roughly constituted by an image input unit 2300 and digital watermark embedding unit 2304. As shown in FIG. 23, an original image is input from the image input unit 2300. The input original image is input to the digital watermark embedding unit 2304. The digital watermark embedding unit 2304 embeds a digital watermark made up of an alignment (registration) signal and additional information in the input image, and outputs a digitally watermarked image.

The digital watermark embedding unit 2304 comprises a registration signal embedding unit 2301 and additional information embedding unit 2302. The registration embedding unit 2301 is a device for embedding a registration signal used for the purpose of alignment to be nearly imperceptible to the human eye. On the other hand, the additional information embedding unit 2302 is a device for embedding additional information as subsidiary information to be nearly imperceptible to the human eye. Note that the order of the registration signal embedding unit 2301 and additional information embedding unit 2302 in the digital watermark embedding unit 2304 is not limited to that of the arrangement shown in FIG. 23, but may be reversed.

Figure 24:
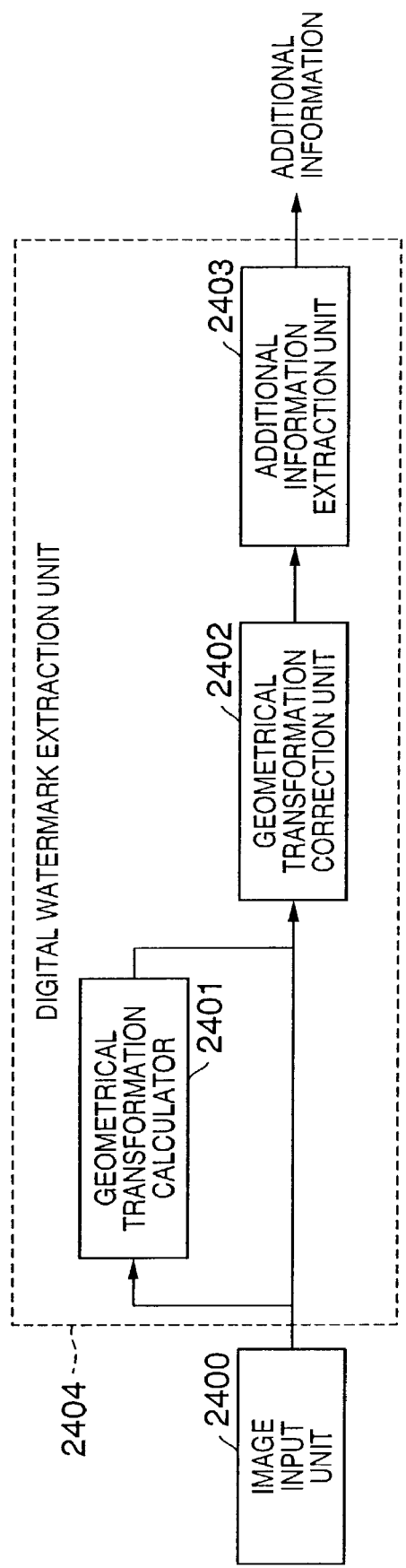
FIG. 24 is a block diagram showing the arrangement of an image processing apparatus for extracting additional information in the embodiment of the present invention.

An image processing apparatus for extracting additional information from an image in which the additional information is embedded in the aforementioned sequence will be explained below. FIG. 24 is a block diagram showing the arrangement of an image processing apparatus for extracting additional information in this embodiment.

An image input unit 2400 is a device for inputting a digitally watermarked image generated in the aforementioned sequence, and is connected to a digital watermark extraction unit 2404. An image input to the digital watermark extraction unit 2404 is input to a geometrical transformation calculator 2401. The calculator 2401 analyzes a registration signal in the digitally watermarked image to calculate a geometrical transformation value applied to the image. The geometrical transformation calculator 2401 outputs the geometrical transformation value applied to the image to a geometrical transformation correction unit 2402.

The geometrical transformation correction unit 2402 corrects the digitally watermarked image input from the image input unit 2400 to an original geometrical state on the basis of the geometrical transformation value input from the geometrical transformation calculator 2401. The unit 2402 outputs the image that has been restored to the original geometrical state to an additional information extraction unit 2403. The additional information extraction unit 2403 extracts additional information from the image which is input from the geometrical transformation correction unit 2402 and has undergone geometrical correction.

Note that the scope of the present invention includes a case wherein the embedded positions of additional information are calculated in consideration of geometrical transformation applied to an image, and additional information is extracted without restoring the original geometrical state of the image.

Figure 25:
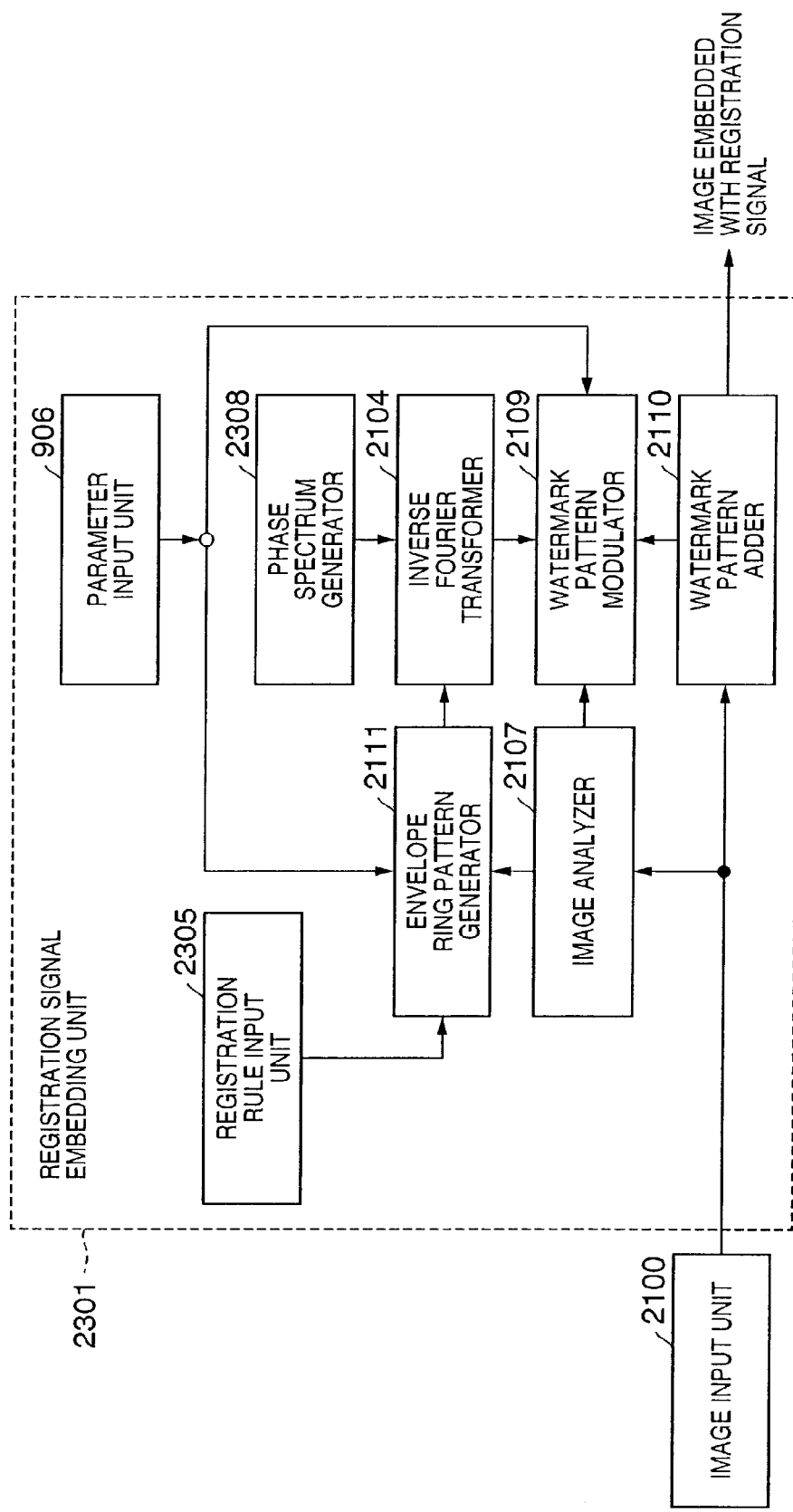
FIG. 25 is a block diagram showing the internal arrangement of a registration signal embedding unit 2301 in the embodiment of the present invention.

The arrangement and operation of the registration signal embedding unit 2301 in FIG. 23 will be explained in detail below. FIG. 25 is a block diagram showing the internal arrangement of the registration signal embedding unit 2301 in this embodiment. The registration signal embedding unit 2301 shown in FIG. 25 has basically the same arrangement as that of the digital watermark embedding unit 2101 described in the second embodiment (FIG. 21), except that it comprises a registration rule input unit 2305 and phase spectrum generator 2308. Note that the same reference numerals in FIG. 25 denote sections which execute the same processes as in the second embodiment (FIG. 21).

The internal process of the registration signal embedding unit 2301 shown in FIG. 25 will be described below. However, a detailed description of the sections that execute the same processes as in the second embodiment (FIG. 21) will be omitted.

Image data input by an image input unit 2100 is input to an image analyzer 2107. The image analyzer 2107 analyzes features of the image to generate image analysis data, and outputs that data to an envelope ring pattern generator 2111.

The envelope ring pattern generator 2111 receives rules for generating a registration signal, which is used as alignment information, from a registration rule input unit 2305. Also, the generator 2111 receives parameter information, which changes depending on the watermark strength or for each embedding, from a parameter input unit 906. The envelope ring pattern generator 2111 generates an envelope ring pattern on the basis of various kinds of information input from the registration rule input unit 2305, parameter input unit 906, and image analyzer 2107.

Note that the envelope ring pattern generator 2111 may generate an envelope ring pattern that does not use any positions corresponding to a high-frequency region 2202 of a Fourier amplitude spectrum, as shown in FIG. 22, so as to remove high-frequency components in, e.g., a flat image on the basis of the image analysis data input from the image analyzer 2107. Also, as in the first embodiment, positions corresponding to a low-frequency region 2201 may not be used as embedding positions.

After the above process, the envelope ring pattern generator 2111 shown in FIG. 25 outputs an amplitude spectrum obtained by manipulating amplitude spectrum levels at positions represented by the envelope ring pattern. The amplitude spectrum generated by the envelope ring pattern generator 2111 is input to an inverse Fourier transformer 2104.

A phase spectrum generator 2308 generates a Fourier phase spectrum, and outputs it to the inverse Fourier transformer 2104. Note that the Fourier phase spectrum in this embodiment may be generated based on a fixed value shared by a digital watermark embedding unit 2304 and digital watermark extraction unit 2404.

The inverse Fourier transformer 2104 generates a watermark pattern that has undergone inverse Fourier transformation (registration signal) on the basis of the amplitude spectrum input from the envelope ring pattern generator 2111 and the phase spectrum input from the phase spectrum generator 2308, and inputs it to a watermark pattern modulator 2109. The watermark pattern modulator 2109 modulates the watermark pattern on the basis of the image analysis data input from the image analyzer 2107, the watermark pattern (registration signal) input from the inverse Fourier transformer 2104, and the watermark strength input from the parameter input unit 906.

Furthermore, the watermark pattern modulator 2109 outputs the modulated watermark pattern (registration signal) to a watermark pattern adder 2110. The watermark pattern adder 2110 adds the modulated watermark pattern to the original image, and outputs a digitally watermark image.

Figure 26:
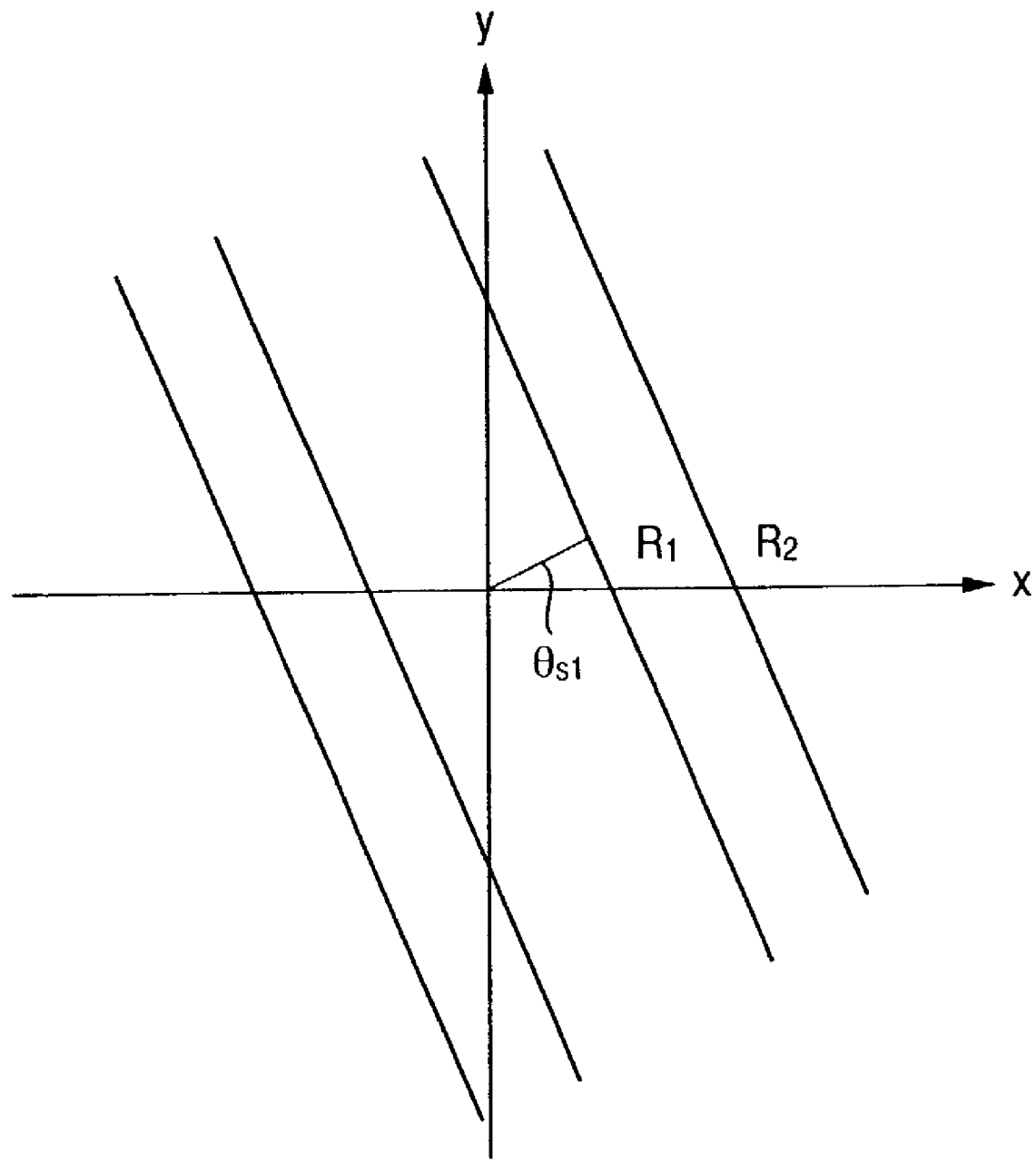
FIG. 26 shows an example of an amplitude spectrum generated by an envelope ring pattern generator 2111 on the basis of input information from a registration rule input unit 2305.

The registration signal based on the envelope ring pattern will be explained below. FIG. 26 shows an example of the amplitude spectrum generated by the envelope ring pattern generator 2111 on the basis of input information from the registration rule input unit 2305. The envelope ring pattern shown in FIG. 26 is expressed by tangents to circles of radii $R_1$ and $R_2$, which have polar coordinates $(\theta_{s1}, R_1)$ and $(\theta_{s1}, R_2)$ as tangent points. Note that FIG. 26 also illustrates tangents to circles, which pass through polar coordinates $(\theta_{s1}+180, R_1)$ and $(\theta_{s1}+180, R_2)$ to be symmetrical about the origin in consideration of the symmetry of the amplitude spectrum.

Figure 27:
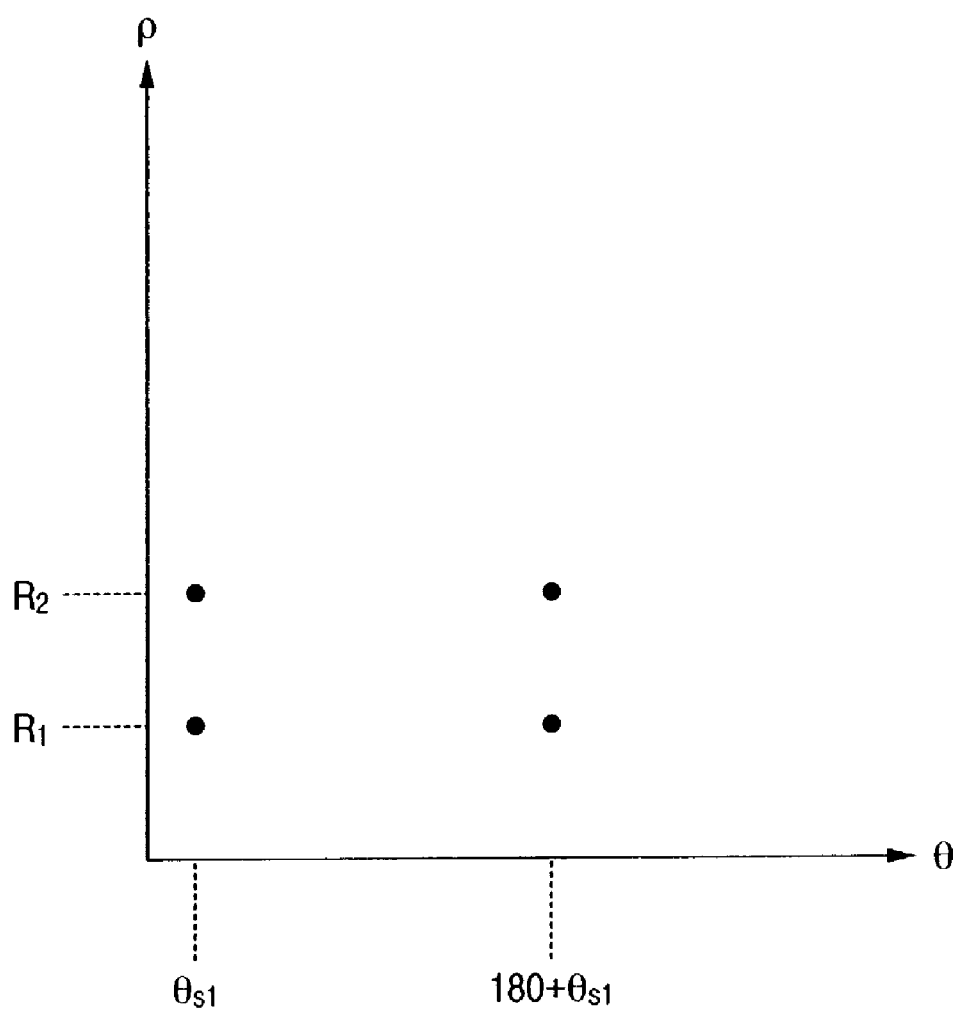
FIG. 27 shows the result of binarization and Hough transformation of the amplitude spectrum shown in FIG. 26.

FIG. 27 shows the result of binarization and Hough transformation of the amplitude spectrum shown in FIG. 26. In FIG. 27, peaks appear at four coordinate positions $(\theta_{s1}, R_1)$, $(\theta_{s1}, R_2)$, $(\theta_{s1}+180, R_1)$, and $(\theta_{s1}+180, R_2)$ in the $\theta\rho$ space.

The reason why the envelop ring pattern shown in FIG. 26 is used as a registration signal will be explained below. As has been described in the first and second embodiments, when an image obtained by embedding an envelope ring pattern in an amplitude spectrum has undergone scaling or rotation, peaks move upon mapping of the envelope ring pattern to the $\theta\rho$ space, as shown in FIG. 27.

For example, let I' be an image obtained as a result of applying $a\times$ scaling and rotation through $\Delta\theta°$ to an image I obtained by embedding the registration signal using the envelope ring pattern shown in FIG. 26 in the amplitude spectrum. Binarization and Hough transformation having the center of the image as the origin are executed for the Fourier amplitude spectrum of the image I'. At this time, peaks at $(\theta_{s1}, R_1)$, $(\theta_{s1}, R_2)$, $(\theta_{s1}+180, R_1)$, and $(\theta_{s1}+180, R_2)$ respectively move to $(\theta_{s1}+\Delta\theta, R_1/a)$, $(\theta_{s1}+\Delta\theta, R_2/a)$, $(\theta_{s1}+\Delta\theta+180, R_1/a)$, and $(\theta_{s1}+\Delta\theta+180, R_2a)$, as denoted by reference numeral 2801 in FIG. 28.

Figure 28:
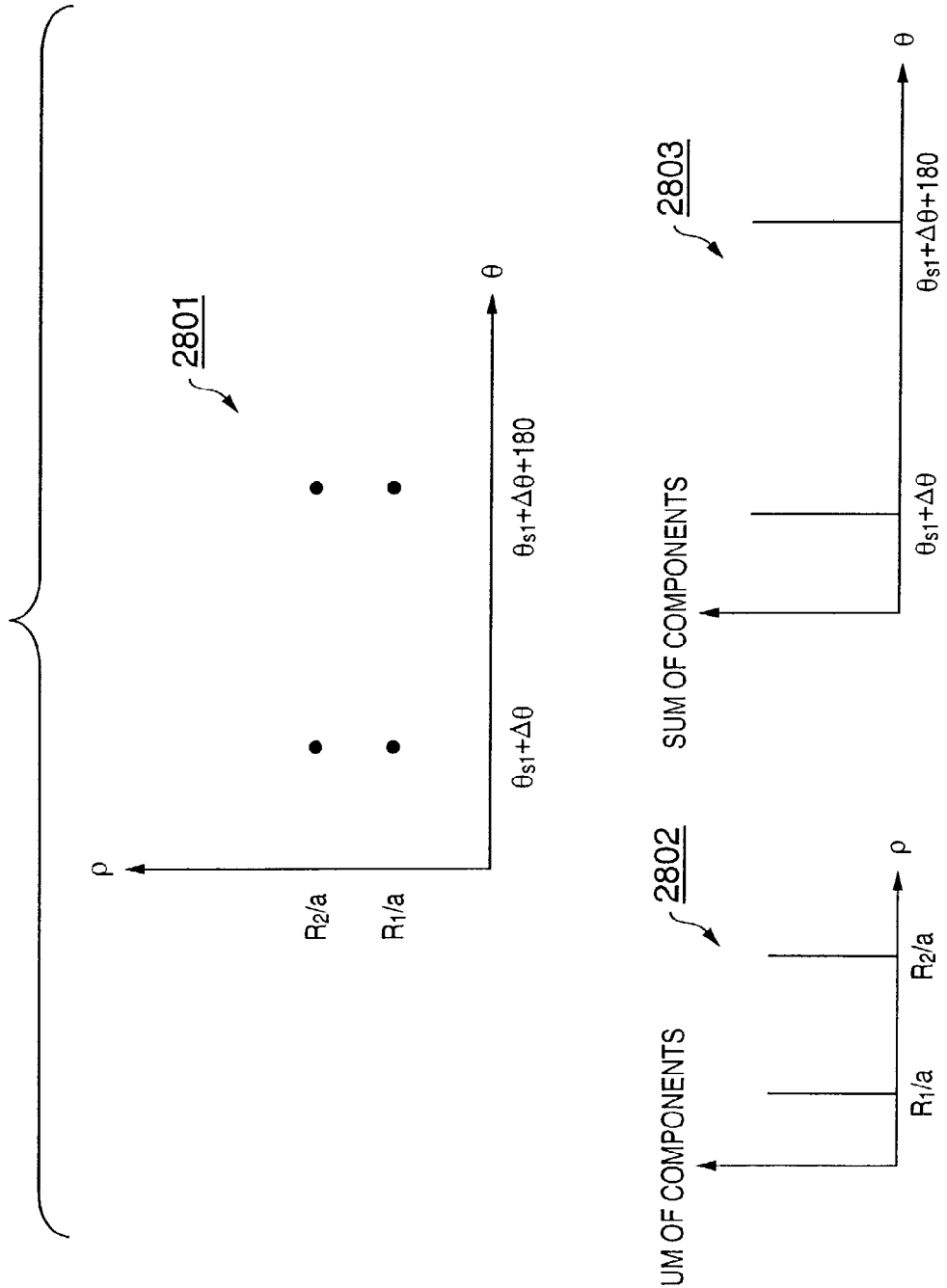
FIG. 28 shows an example of a process that emphasizes peaks by executing binarization and Hough transformation using the center of an image as an origin for a Fourier amplitude spectrum of an image I' that has undergone ax scaling and Δθ° rotation.

FIG. 28 shows an example of a process that emphasizes peaks by executing binarization and Hough transformation using the center of an image as the origin for the Fourier amplitude spectrum of the image I' that has undergone $a\times$ scaling and $\Delta\theta°$ rotation. Reference numeral 2802 in FIG. 28 denotes the sums of components denoted by reference numeral 2801 in the $\theta$ direction; 2803, the sums of components denoted by reference numeral 2801 in the $\rho$ direction. As shown in FIG. 28, peak are generated at $R_1/a$ and $R_2/a$ in the graph 2802, and $\theta_{s1}+\Delta\theta$ and $\theta_{s1}+\Delta\theta+180$ in the graph 2803.

When the registration signal embedding unit 2301 and registration signal extraction means share $R_1-R_2$ and $\theta_{s1}$ as rules for generating the registration signals, the scaling a and rotation angle $\Delta\theta$ applied to the image embedded with the registration signal can be obtained.

$$a=(R_1-R_2)/(R'_1-R'_2) \tag{10}$$

$$\Delta\theta=\theta'_{s1}-\theta_{s1} \tag{11}$$

As for the scaling, $R_1$ (or $R_2$) can be freely set by determining $R_1-R_2$ in advance. Note that $\theta_{s1}$ must be determined in advance for the rotation angle.

In the above description, the registration signal is expressed by the tangents to the circles of radii $R_1$ and $R_2$ at polar coordinates $(\theta_{s1}, R_1)$ and $(\theta_{s1}, R_2)$ for the sake of simplicity. Alternatively, the registration signal may be expressed by tangents to circles of radii $R_1$ and $R_2$ at polar coordinates $(\theta_{s1}, R_1), (\theta_{s1}, R_1), \ldots, (\theta_{si}, R_1), \ldots, (\theta_{sN}, R_1)$, and $(\theta_{s1}, R_2), (\theta_{s1}, R_2), \ldots, (\theta_{si}, R_2), \ldots, (\theta_{sN}, R_2)$.

In this case, cross-correlation between a peak array $\{P(\theta'_{si})\}$ as the sums of components in the $\rho$ direction on the $\theta\rho$ space denoted by reference numeral 2801, and original embedded positions $\{P(\theta_{s1})\}$ is calculated, and the rotation angle applied to the image can be obtained using a translation amount calculated from a position of the maximum cross-correlation. At this time, the original embedded positions $\{P(\theta_{s1})\}$ must have high auto correlation as a condition, and must be shared by the registration signal embedding unit 2301 and registration signal extraction means. In this case, a merit that the registration signal becomes harder to analyze can also be obtained.

The registration rule input unit 2305 generates a registration signal which satisfies the aforementioned registration signal conditions. With the above process, the amplitude spectrum of the image is analyzed, and the scaling and rotation angle applied to the image can be obtained. However, the rotation angle obtained from the amplitude spectrum still has indefiniteness of an integer multiple of 180°. Also, since the Fourier amplitude spectrum remains unchanged with respect to translation, the translation amount applied to the image cannot be obtained.

Figure 29:
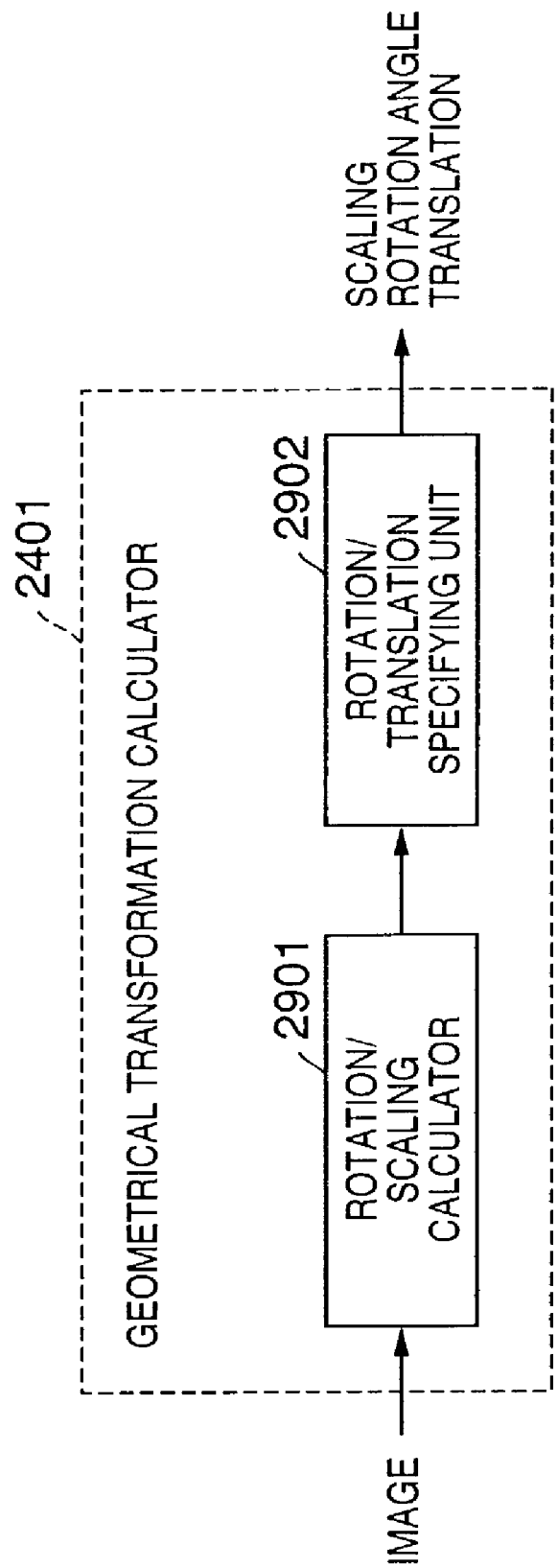
FIG. 29 is a block diagram showing the detailed arrangement of a geometrical transformation calculator 2401 as one building component of a digital watermark extraction unit 2404.

Hence, the internal process of the geometrical transformation calculator 2401 for specifying scaling, rotation, and translation applied to the image will be explained below. FIG. 29 is a block diagram showing the detailed arrangement of the geometrical transformation calculator 2401 as one building component of the digital watermark extraction unit 2404. As shown in FIG. 29, the geometrical transformation calculator 2401 comprises a rotation/scaling calculator 2901 and rotation/translation specifying unit 2902.

The rotation/scaling calculator 2901 is a device for computing the Fourier transforms of an input image, and calculating the scaling and rotation angle applied to the image on the basis of the amplitude spectrum, as described above. However, the calculated rotation angle still has indefiniteness of an integer multiple of 180°.

Figure 30:
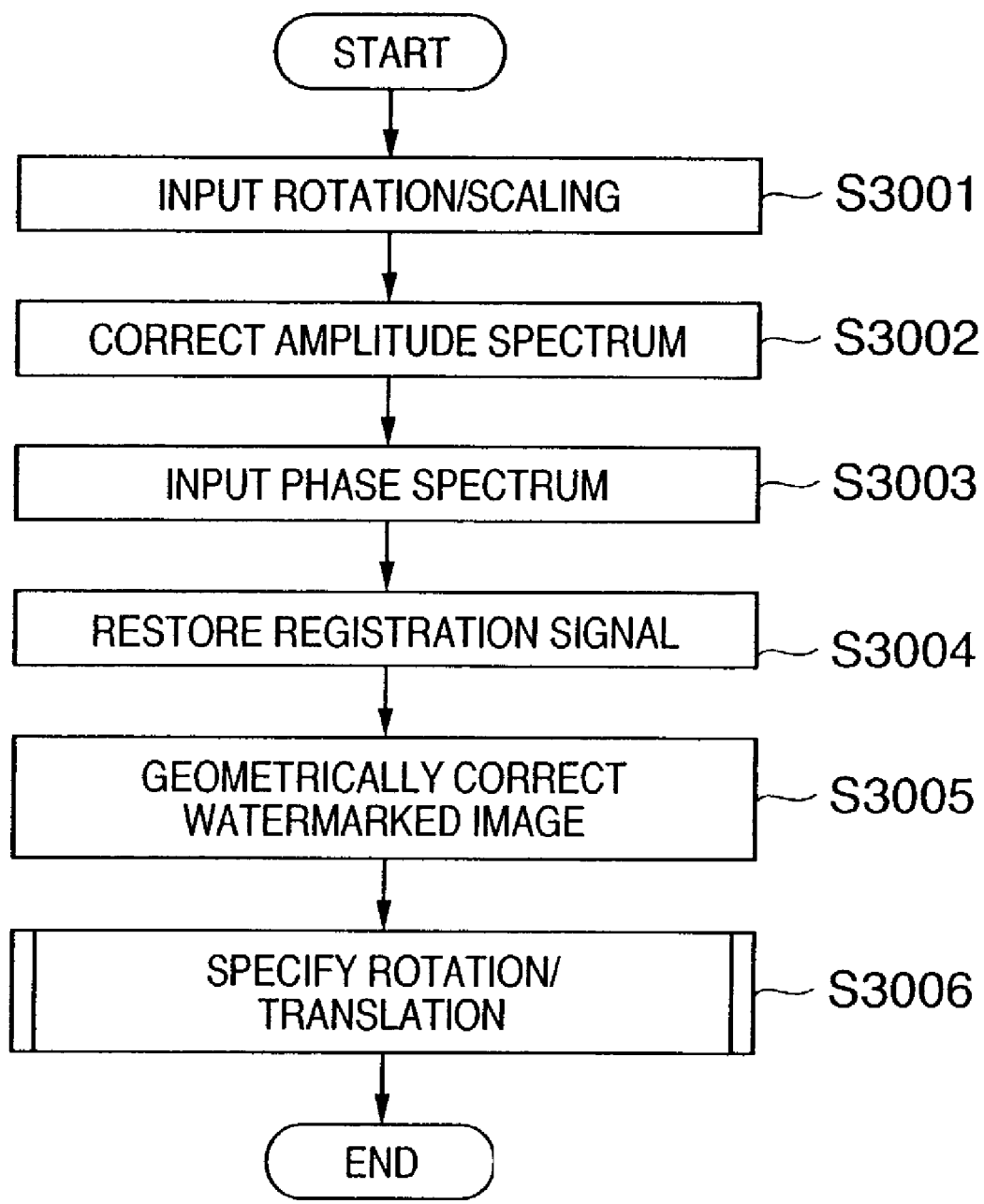
FIG. 30 is a flow chart for explaining the operation sequence of a rotation/translation specifying unit 2902.

The rotation/translation specifying unit 2902 is a device for uniquely calculating and outputting the rotation angle and translation amount applied to the image on the basis of the image and the rotation angle/scaling input from the rotation/scaling calculator 2901. The internal process of the rotation/translation specifying unit 2902 will be described in detail below. FIG. 30 is a flow chart for explaining the operation sequence of the rotation/translation specifying unit 2902.

As shown in the flow chart of FIG. 30, the scaling and the rotation angle which still has indefiniteness of 180° are input to the rotation/translation specifying unit 2902 (step S3001). An envelope ring pattern as a registration signal that has undergone correction of the scaling and rotation angle is restored (step S3002). Furthermore, a predetermined phase spectrum is input (step S3003). As described above, the phase spectrum in this embodiment must be shared by the digital watermark embedding unit 2101 and digital watermark extraction unit 2404, as has already been explained above, and is not variable for each embedding in this embodiment.

The inverse Fourier transforms of the amplitude spectrum embedded with the envelope ring pattern, and phase spectrum are computed to restore a registration signal (step S3004). With this manipulation, a registration signal R" nearly identical to the embedded registration signal R can be restored.

Then, an image I" obtained by correcting the rotation and scaling of the digitally watermarked image is calculated (step S3005). Since the rotation angle in this process still has indefiniteness of 180°, translation is not corrected. The cross-correlation between the restored registration signal R" and restored image I" is calculated for a case wherein I" has suffered 0° rotation, and a case wherein I" has suffered 180° rotation, thus specifying the rotation angle and translation (step S3006).

Figure 31:
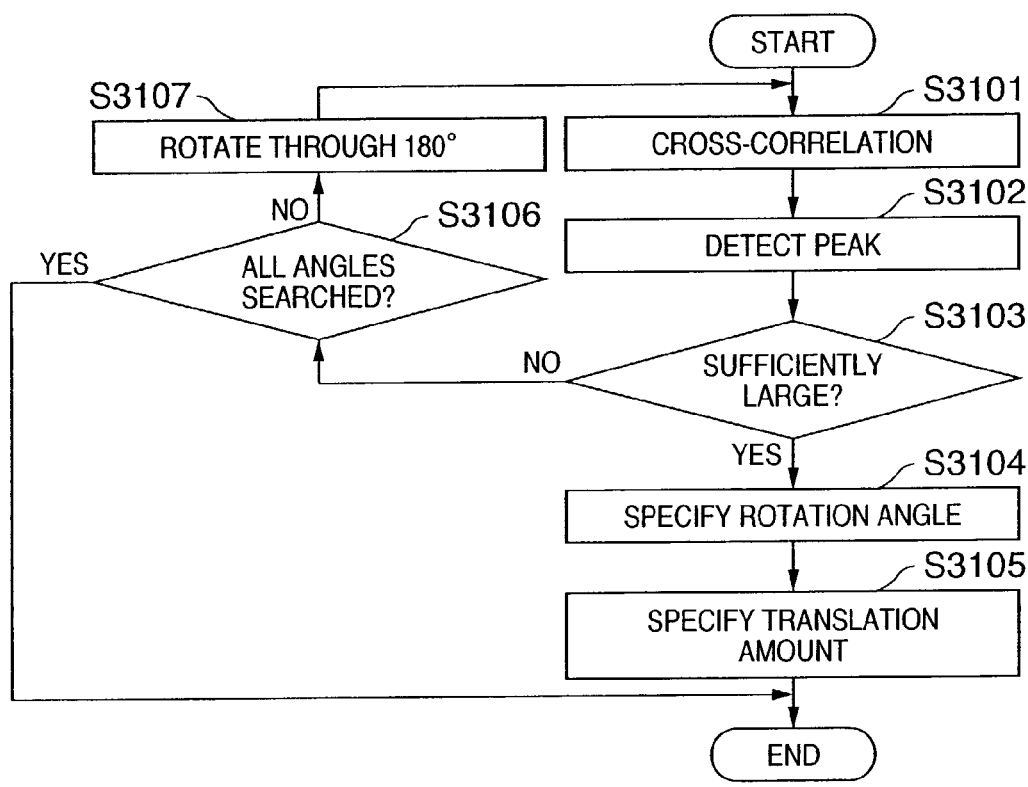
FIG. 31 is a flow chart for explaining the detailed sequence for uniquely specifying rotation/translation specified in step S3006 in FIG. 30.

The processing sequence of the rotation/translation specifying step S3006 will be described in detail below. FIG. 31 is a flow chart for explaining the detailed sequence for uniquely specifying rotation/translation specified in step S3006 in FIG. 30. The cross-correlation between the restored registration signal R" and corrected image I" is calculated (step S3101). A peak obtained as a result of the cross-correlation is detected (step S3102).

It is then checked if the detected peak is sufficiently large (step S3103). As a result, if the peak is not sufficiently large (No), the flow advances to step S3106. On the other hand, if the detected peak is sufficiently large (Yes), the rotation angle calculated in step S3006 is added to the rotation angle which is calculated from the amplitude spectrum and has indefiniteness of an integer multiple of 180°, thereby uniquely specifying the rotation angle (step S3104). Note that the rotation angle cannot be uniquely specified unless the registration signal is not rotation-symmetric. The translation amount is calculated from the peak position as a result of the cross-correlation (step S3105), thus ending the process.

On the other hand, it is determined in step S3106 if all angles have been checked. As a result, if all angles have been checked (Yes), the process ends. By contrast, if all angles have not been checked yet (No), the corrected image I" is rotated through 180° (step S3107). The flow then returns to step S3101 to repeat the specifying process in the same sequence.

As described above, although the registration signal, the amplitude spectrum of which is based on the envelope ring pattern, is variable depending on an image, watermark strength, and the like, scaling, rotation, and translation can be specified. Therefore, even when the additional information embedding unit 2302 shown in FIG. 23 uses an additional information embedding algorithm, which has no robustness against geometrical transformation, the additional information extraction unit 2403 shown in FIG. 24 can accurately extract additional information.

As in the first and second embodiments, the registration signal need not always be a line on the amplitude spectrum, but may be a half line or a plurality of points on a line. Or the registration signal may be points on a function expressed by formula based on points ($\phi_i$, $R_j$) on the polar coordinate system, or may be points on a function based on a circle, ellipse, or fractal or chaos theory. Needless to say, such function serves as key information upon extraction.

In this manner, using a plurality of envelope ring patterns having given conditions, the registration signal can be varied in accordance with various parameters such as features of an image, watermark strength, and the like. As a result, a common signal can be made harder to be uncovered/removed by coalition attacks.

Also, the parameter of the registration signals may be changed in accordance with additional information to be embedded before and after the registration signal, and the additional information embedding method. For example, when additional information is embedded after the registration signal using a digital watermarking scheme of A or B company, the registration signal may be changed using information that represents A or B company as a parameter.

That is, the present invention is directed to an image processing apparatus (digital watermark embedding unit 2304) which comprises digital watermark information embedding means (additional information embedding unit 2302) for embedding digital watermark information to be imperceptible or nearly imperceptible to the human eye, characterized by comprising an image input unit 2100 for inputting image data, a phase spectrum generator 2308 for generating new phase component data, alignment information input means (registration rule input unit 2305) for inputting alignment information used to detect geometrical transformation of an image, embedding pattern generation means (envelope ring pattern generator 2111) for generating an embedding pattern of the alignment information, which is expressed by a predetermined function having an envelope of at least one circle with respect to the new amplitude component data, alignment information embedding means (envelope ring pattern generator 2111) for embedding the alignment information at a predetermined position of the embedding pattern on the function, inverse frequency transformation means (inverse Fourier transformer 2104) for generating a registration signal from the amplitude component data embedded with the alignment information, and phase component data, a watermark pattern modulator 2109 for modulating the registration signal, and a watermark pattern adder 2110 for adding the modulated registration signal to the input image data.

The present invention is characterized by further comprising a parameter input unit 906 for inputting a parameter which changes an embedding strength upon embedding the alignment information in the image data.

Furthermore, the present invention is directed to an image processing apparatus (digital watermark embedding unit 2304) which comprises digital watermark information embedding means (additional information embedding unit 2302) for embedding digital watermark information to be imperceptible or nearly imperceptible to the human eye, characterized by comprising an image input unit 2100 for inputting image data, a phase spectrum generator 2308 for generating new phase component data, alignment information input means (registration rule input unit 2305) for inputting alignment information used to detect geometrical transformation of an image, a parameter input unit 906 for inputting a parameter which changes an embedding strength upon embedding the alignment information, embedding pattern generation means (envelope ring pattern generator 2111) for embedding the alignment information in the new amplitude component data using a predetermined embedding pattern having an envelope of at least one circle, inverse frequency transformation means (inverse Fourier transformer 2104) for computing the frequency transforms of the embedding pattern using the amplitude component data embedded with the alignment information, and phase component data, modulation means (watermark pattern modulator 2109) for modulating the embedding pattern using the parameter, and addition means (watermark pattern adder 2110) for adding the modulated embedding pattern to the image data.

Moreover, the present invention is characterized by further comprising an image analyzer 2107 for analyzing the strength of amplitude component data, and in that the embedding pattern generation means (envelope ring pattern generator 2111) sets an envelope in accordance with the output result of the image analyzer. The present invention is characterized in that the digital watermark information embedding means (additional information embedding unit 2302) comprises a frequency transformer for computing the frequency transforms of an image to convert the image into amplitude component data and phase component data, an embedding pattern generator for generating an embedding pattern of digital watermark information expressed by a set of lines having a predetermined envelope on the generated amplitude component data, a digital watermark information embedding unit for embedding digital watermark information at predetermined positions on the lines in the embedding pattern, and an inverse frequency transformer for computing the inverse frequency transforms of the amplitude component data embedded with the digital watermark information using the phase component data.

In addition, the present invention is characterized by embedding alignment information in the image in which digital watermark information is embedded to be imperceptible or nearly imperceptible to the human eye using the digital watermark information embedding means (additional information embedding unit 2302). Furthermore, the present invention is characterized by embedding digital watermark information in an image in which alignment information is embedded to be imperceptible or nearly imperceptible to the human eye.

Fifth Embodiment

In the description of the fourth embodiment, the additional information extraction unit 2403 uses an algorithm that must accurately detect scaling, rotation, and translation applied to an image. In this embodiment, the additional information extraction unit 2403 can extract additional information by detecting only a part of geometrical transformation applied to an image.

When the additional information embedding unit 2302 embeds additional information on the Fourier amplitude spectrum, since translation and indefiniteness of the rotation angle applied to an image can be canceled upon calculating the amplitude spectrum by the additional information extraction unit 2403, the need for the process in the rotation/translation specifying unit 2902 in FIG. 29 can be obviated.

In this embodiment, the registration signal generated by the digital watermark embedding unit 2101 may be added to an image on the spatial domain. In this case, even when additional information is embedded to the Fourier amplitude spectrum, the phase spectrum suffers no influence upon extracting the additional information. Therefore, the phase spectrum need not be shared by the digital watermark embedding unit 2304 and digital watermark extraction unit 2404 unlike in the digital watermark embedding unit 2101 shown in FIG. 21, and may assume a value which changes depending on parameters. Also, the registration signal may be directly added on the Fourier amplitude spectrum of an image, as shown in FIG. 9.

Figure 19:
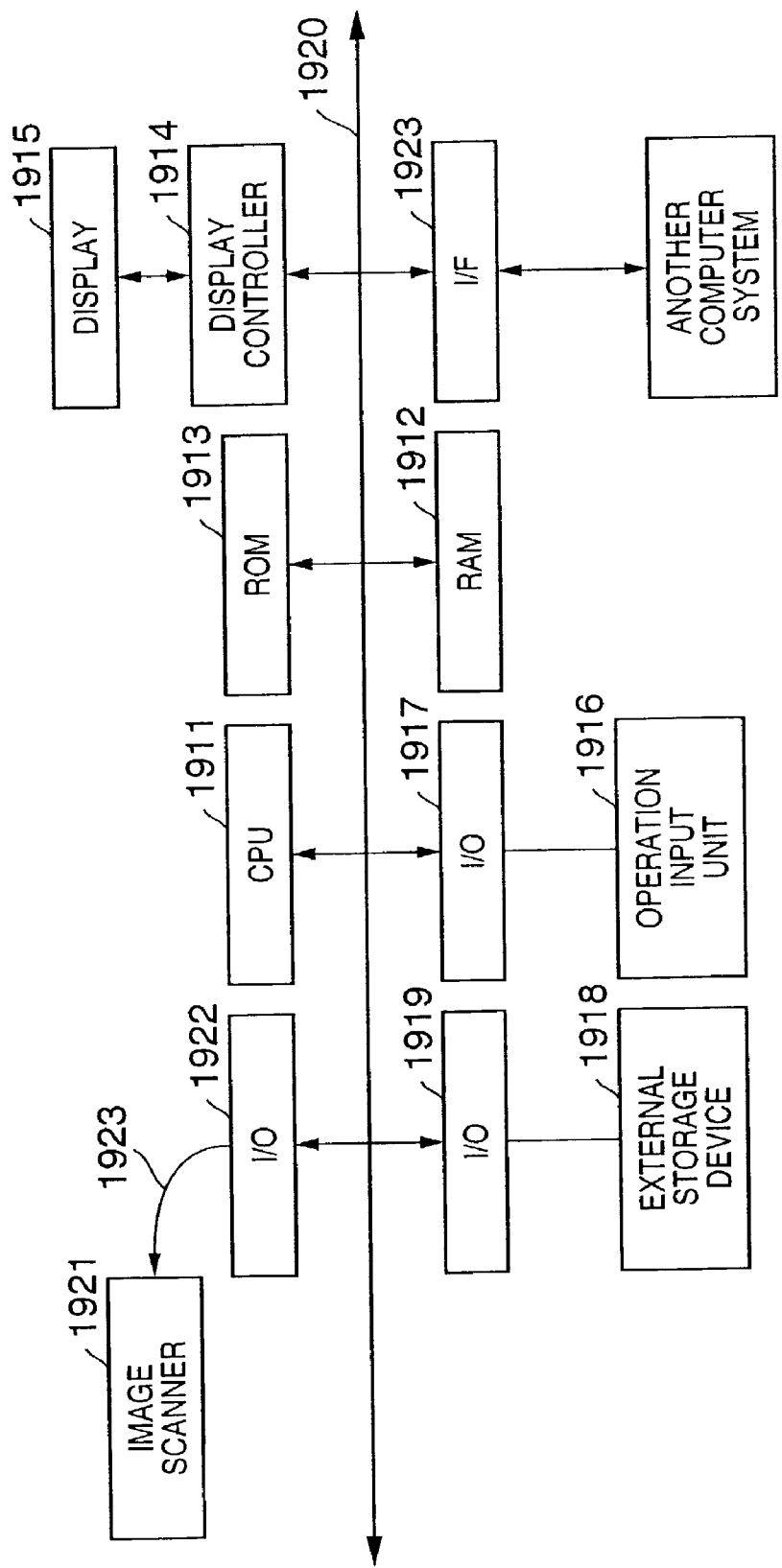
FIG. 19 is a block diagram showing the arrangement of a computer that implements extraction of a digital watermark in an image processing apparatus according to the present invention.

As described above, the registration signal, the amplitude spectrum of which is based on the envelope ring pattern, can be used as a signal used to specify the embedded positions of additional information, although it is variable depending on an image, watermark strength, and the like. FIG. 19 is a block diagram showing the arrangement of a computer that implements extraction of a digital watermark in an image processing apparatus according to the present invention. Referring to FIG. 19, a CPU 1911, RAM 1912, ROM 1913, display controller 1914, connection I/O 1917 for an operation input device such as a device keyboard, mouse, or the like, connection I/O 1919 for an external storage device, connection I/O 1922 for an image input device such as a color image scanner or the like, and interface 1923 for another computer system as building components of this apparatus are connected to a bus 1920.

A color image scanner 1921 is connected to the connection I/O 1922 for an image input device such as a color image scanner or the like. Also, a display 1915 is connected to the display controller 1914. Furthermore, an operation input unit 1916 such as a keyboard, mouse, or the like is connected to the connection I/O 1917 for an operation input device. Moreover, an external storage device 1918 such as a hard disk device or the like is connected to the connection I/O 1919 for an external storage device.

An image processing apparatus for extracting a digital watermark, which has been explained in the first, second, and third embodiments of the present invention, practices the present invention in such a manner that a program which is pre-stored in the ROM 1913 as a computer executable program is loaded onto the RAM 1912, a program which is pre-stored in the external storage device 1919 is loaded onto the RAM 1912, or a program which is downloaded via the interface 1923 with a communication means such as a network or the like is loaded onto the RAM 1912, and the CPU 1911 executes that program.

When an object which is to undergo digital watermark extraction is an image, the image is input using the color image scanner 1921 or an input device such as a digital camera or the like in place of the color image scanner. The input image is saved in the RAM 1912 via the connection I/O 1922, via the external storage device 1918 and connection I/O 1919, or via the communication unit 1923 such as a network or the like.

When an object which is to undergo digital watermark extraction is an audio signal, the audio signal is input using an audio input device such as a microphone or the like in place of the color image scanner 1921 shown in FIG. 19. The input audio signal is saved in the RAM 1912 via the connection I/O 1922, via the external storage device 1918 and connection I/O 1919, or via the communication unit 1923 such as a network or the like.

When an object which is to undergo digital watermark extraction is moving image data, the moving image data is input using an input device such as a digital camera or the like in place of the color image scanner 1921 shown in FIG. 19. The input moving image data is saved in the RAM 1912 via the connection I/O 1922, via the external storage device 1918 and connection I/O 1919, or via the communication unit 1923 such as a network or the like. Note that a digital watermark extraction processing program is controlled via input from the keyboard & mouse 1916 or the communication unit 1923 such as a network or the like.

Sixth Embodiment

This embodiment will explain a case wherein an envelope ring pattern is used as a background image of a document image. Therefore, additional information is embedded as a visible two-dimensional pattern using an envelope ring pattern in place of an invisible digital watermark. In this case, various kinds of additional information are expressed as envelope ring patterns denoted by reference numerals 101 and 102 in FIG. 1, and are directly laid out on the background of document information.

For example, a method of embedding additional information in an image, all pixels of which are "1"s, using an envelope ring pattern without computing the Fourier transforms as in the first embodiment is available. This image and document data are added to generate a document image in which the background image of the document data has a pattern approximate to the envelope ring pattern.

In this embodiment, however, upon extracting additional information from the envelope ring pattern, the origin of the envelope ring pattern must be detected in advance, and Hough transformation must then be executed. This is because when the origin of the envelope ring pattern does not match that upon executing Hough transformation, peaks are arranged on a sine wave in a mapped image obtained by mapping lines of the envelope ring pattern to the θρ space.

As methods of detecting the origin position of the envelope ring pattern, approaches such as a method of designating the central position in advance, a method of detecting an envelope as a circle by, e.g., Hough transformation, a method of detecting positions where peaks of the envelope ring pattern line up on a line, and the like are available.

Furthermore, by superposing a plurality of envelope ring patterns having different radii, the size of information to be embedded in an image can be increased. Moreover, since the envelope ring pattern itself has a geometrical feature, a special effect (e.g., a decorative effect on a document image or the like) can be given.

Seventh Embodiment

The seventh embodiment will explain a method of embedding additional information in a document image or the like described in the fourth embodiment by applying the scheme of the first embodiment. In this embodiment, in the image processing apparatus for embedding a digital watermark shown in FIG. 9, a flat image (e.g., an image having all pixels=128) is given as an input image in place of a density image. After the Fourier transforms of the input image are computed, and additional information is embedded as in the first embodiment. An original document image or the like is added to the image embedded with the additional information. Note that additional information can be extracted using an arrangement which is substantially the same as that of the image processing apparatus for extracting a digital watermark of the first embodiment (FIG. 4).

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the recording medium, that recording medium stores program codes corresponding to the aforementioned flow charts.

To recapitulate, according to the present invention, a digital watermark which has strong robustness against geometrical transformation/edit processes such as rotation, scaling, translation, and the like, can be embedded. Also, even after the conversion/edit process such as rotation of an image or the like, the embedded digital watermark can be accurately extracted.

Furthermore, according to the present invention, the robustness against coalition attacks which are effective to analyze/remove a common signal can be improved by changing an alignment signal, which is commonly used to reinforce the robustness against geometrical attacks, on the basis of image characteristics, additional information, or information for each embedding.

The present invention is not limited to the above embodiments and various changes and modifications can be made within the spirit and scope of the present invention. Therefore, to apprise the public of the scope of the present invention, the following claims are made.

What is claimed is:

1. An image processing apparatus for embedding digital watermark information in an image, comprising:
    frequency transformation means for computing frequency transforms of an image to convert the image into amplitude component data and phase component data;
    embedding pattern generation means for generating an embedding pattern of digital watermark information, which is expressed by a set of lines having an envelope ring pattern, on the generated amplitude component data;
    digital watermark embedding means for embedding digital watermark information at positions set on the lines in the embedding envelope ring pattern; and
    inverse frequency transformation means for computing inverse frequency transforms of the amplitude component data embedded with the digital watermark information using the phase component data.

2. The apparatus according to claim 1, further comprising parameter input means for inputting a parameter which changes depending on a watermark strength upon embedding the digital watermark information in the image or for each embedding.

3. An image processing apparatus for embedding digital watermark information in an image, comprising:
    image input means for inputting frequency-transformed image data;
    inverse frequency transformation means for generating a watermark envelope ring pattern, which is expressed by a set of lines having an envelope ring pattern using amplitude component data obtained from the input image data, and phase component data;
    watermark pattern modulation means for modulating the amplitude component data and the watermark envelope ring pattern; and
    watermark pattern addition means for adding the modulated watermark pattern to the input image data.

4. The apparatus according to claim 1, wherein the envelope defines a circle.

5. An image processing method for embedding digital watermark information in an image, comprising:
    the image input step of inputting an image;
    the frequency transformation step of computing frequency transforms of the input image to convert the image into amplitude component data and phase component data;
    the embedding pattern generation step of generating an embedding pattern of digital watermark information, which is expressed by a set of lines having an envelope ring pattern, on the generated amplitude component data;
    the digital watermark embedding step of embedding digital watermark information at positions set on the lines in the embedding envelope ring pattern; and
    the inverse frequency transformation step of computing inverse frequency transforms of the amplitude component data embedded with the digital watermark information using the phase component data.

6. The method according to claim 5, further comprising the parameter input step of inputting a parameter which changes depending on a watermark strength upon embedding the digital watermark information in the image or for each embedding.

7. The method according to claim 5, wherein the envelope defines a circle.

8. A computer program embeded on a computer-readable medium for controlling an image processing apparatus for embedding digital watermark information in an image, comprising:
    a program code of the image input step of inputting an image;
    a program code of the frequency transformation step of computing frequency transforms of the input image to convert the image into amplitude component data and phase component data;
    a program code of the embedding pattern generation step of generating an embedding pattern of digital watermark information, which is expressed by a set of lines having an envelope ring pattern, on the generated amplitude component data;
    a program code of the digital watermark embedding step of embedding digital watermark information at positions set on the lines in the embedding envelope ring pattern; and
    a program code of the inverse frequency transformation step of computing inverse frequency transforms of the amplitude component data embedded with the digital watermark information using the phase component data.

9. The program according to claim 8, further comprising a program code of the parameter input step of inputting a parameter which changes depending on a watermark strength upon embedding the digital watermark information in the image or for each embedding.

10. The computer program according to claim 8, wherein the envelope defines a circle.

11. A computer readable medium storing a computer program of claim 8.

* * * * *

UNITED STATES PATENT AND TRADEMARK OFFICE
CERTIFICATE OF CORRECTION

PATENT NO. : 7,065,237 B2
APPLICATION NO. : 10/314168
DATED : June 20, 2006
INVENTOR(S) : Tomochika Murakami Page 1 of 1

It is certified that error appears in the above-identified patent and that said Letters Patent is hereby corrected as shown below:

COLUMN 5:
Line 5, "drawings" should read --drawing--.

COLUMN 10:
Line 21, "envelop" should read --envelope--.

COLUMN 20:
Lines 61 and 65, "$\{P(\theta_{s1})\}$" should read --$\{P(\theta_{si})\}$--.

COLUMN 27:
Line 42, "pattern" should read --pattern,--.

COLUMN 28:
Line 47, "program" should read --computer program--.
Line 54, "computer readable" should read --computer-readable--.

Signed and Sealed this

Twenty-ninth Day of May, 2007

JON W. DUDAS
*Director of the United States Patent and Trademark Office*